(12) United States Patent
Yamada et al.

(10) Patent No.: US 11,383,541 B2
(45) Date of Patent: Jul. 12, 2022

(54) PRINTING APPARATUS, PRINTING SYSTEM, METHOD OF CONTROLLING PRINTING APPARATUS, METHOD OF CONTROLLING PRINTING SYSTEM, AND STORAGE MEDIUM

(71) Applicant: CANON KABUSHIKI KAISHA, Tokyo (JP)

(72) Inventors: Akitoshi Yamada, Yokohama (JP); Nobuyuki Bannai, Machida (JP); Arata Miyagi, Kawasaki (JP); Ruriko Mikami, Kawasaki (JP); Nobuo Onuma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/937,639

(22) Filed: Jul. 24, 2020

(65) Prior Publication Data

US 2020/0353762 A1 Nov. 12, 2020

Related U.S. Application Data

(60) Continuation of application No. 16/659,967, filed on Oct. 22, 2019, now Pat. No. 10,773,536, which is a (Continued)

(30) Foreign Application Priority Data

Mar. 31, 2017 (JP) .............................. JP2017-071532
Nov. 28, 2017 (JP) .............................. JP2017-228146

(51) Int. Cl.
*B41J 29/393* (2006.01)
*B41J 2/15* (2006.01)
(Continued)

(52) U.S. Cl.
CPC ............... *B41J 29/393* (2013.01); *B41J 2/15* (2013.01); *B41J 2/165* (2013.01); *B41J 2/2103* (2013.01);
(Continued)

(58) Field of Classification Search
CPC ............. G06F 3/14; G06F 3/12; G06F 3/1253
See application file for complete search history.

(56) References Cited

U.S. PATENT DOCUMENTS

| 5,757,394 A | 5/1998 | Gibson et al. |
| 6,050,674 A | 4/2000 | Hirabayashi et al. |

(Continued)

FOREIGN PATENT DOCUMENTS

| CN | 1108586 C | 5/2003 |
| EP | 1540457 A1 | 6/2005 |

(Continued)

OTHER PUBLICATIONS

Japanese Office Action dated Oct. 6, 2020, in related Japanese Patent Application No. 2017-228146 (with English translation).

(Continued)

*Primary Examiner* — Lam S Nguyen
(74) *Attorney, Agent, or Firm* — Venable LLP

(57) ABSTRACT

A printing system includes a printing apparatus providing, in a case a first type of printing material is loaded to a print unit without loading a second type of printing material, a host device with a first printing service using a first identifier to identify the printing apparatus, and in a case where at least the second type of printing material is loaded to the print unit, to provide the host device with a second printing service using a different second identifier. The host device obtains printability information when an identifier provided from the printing apparatus is an unknown identifier, the printability information being information indicating a print- (Continued)

able condition with the printing apparatus, sets the printable condition with the printing apparatus based on the obtained printability information, and transmits a printing job based on the set condition to the printing apparatus.

32 Claims, 11 Drawing Sheets

Related U.S. Application Data division of application No. 15/920,620, filed on Mar. 14, 2018, now Pat. No. 10,493,784.

(51) Int. Cl.
 *G06F 3/12* (2006.01)
 *B41J 2/21* (2006.01)
 *B41J 2/51* (2006.01)
 *B41J 2/165* (2006.01)

(52) U.S. Cl.
 CPC .............. *B41J 2/51* (2013.01); *G06F 3/1203* (2013.01); *G06F 3/1205* (2013.01); *G06F 3/1226* (2013.01); *G06F 3/1253* (2013.01); *G06F 3/1232* (2013.01)

(56) References Cited

U.S. PATENT DOCUMENTS

| | | | |
|---|---|---|---|
| 6,128,098 A | 10/2000 | Kamada et al. | |
| 6,388,758 B2 | 5/2002 | Kawanabe et al. | |
| 6,557,033 B2 | 4/2003 | Maeda | |
| 6,568,783 B2 | 5/2003 | Hu et al. | |
| 6,568,785 B1 | 5/2003 | Edelen et al. | |
| 6,623,100 B1 | 9/2003 | Baitz et al. | |
| 7,044,574 B2 | 5/2006 | Croley et al. | |
| 7,123,367 B1 | 10/2006 | Kanaye et al. | |
| 7,213,067 B2 | 5/2007 | Maeda | |
| 7,614,737 B2 | 11/2009 | Ahne et al. | |
| 7,715,033 B2 | 5/2010 | Mikami et al. | |
| 9,672,450 B2 | 6/2017 | Hashii et al. | |
| 2001/0015818 A1 | 8/2001 | Kawanabe et al. | |
| 2004/0125165 A1 | 7/2004 | Croley et al. | |
| 2004/0252150 A1 | 12/2004 | Iwata | |
| 2005/0057772 A1 | 3/2005 | Mikami et al. | |
| 2007/0097157 A1 | 5/2007 | Na | |
| 2012/0008166 A1* | 1/2012 | Noto | G06F 3/1285 358/1.15 |
| 2017/0282586 A1 | 10/2017 | Sasaki et al. | |
| 2018/0250941 A1* | 9/2018 | Suzuki | B41J 29/42 |

FOREIGN PATENT DOCUMENTS

| | | |
|---|---|---|
| JP | H10-187380 A | 7/1998 |
| JP | H11-115253 A | 4/1999 |
| JP | H11-161444 A | 6/1999 |
| JP | H11-227181 A | 8/1999 |
| JP | H11-227305 A | 8/1999 |
| JP | 2000-118082 A | 4/2000 |
| JP | 2006-218624 A | 8/2006 |
| JP | 3919716 A | 5/2007 |

OTHER PUBLICATIONS

Japanese Office Action dated Feb. 4, 2020, in related Japanese Patent Application No. 2017-228146 (with English translation).
Chinese Office Action dated Mar. 30, 2020, in related Chinese Patent Application No. 201810270132.4 (with English translation).

\* cited by examiner

PRINTING APPARATUS, PRINTING SYSTEM, METHOD OF CONTROLLING PRINTING APPARATUS, METHOD OF CONTROLLING PRINTING SYSTEM, AND STORAGE MEDIUM

This application is a continuation of application Ser. No. 16/659,967, filed Oct. 22, 2019, which is a divisional of application Ser. No. 15/920,620, filed Mar. 14, 2018, now U.S. Pat. No. 10,493,784, issued Dec. 2, 2019.

BACKGROUND OF THE INVENTION

Field of the Invention

The present invention relates to a printing apparatus, a printing system, a method of controlling a printing apparatus, a method of controlling a printing system, and a storage medium.

Description of the Related Art

Among printing apparatuses, there is a printing apparatus configured to communicate directly with any of an image capturing device such as a digital camera, a multifunctional terminal such as a smartphone, a host computer, and the like (hereinafter collectively referred to as a "host device") without the intermediary of a printer driver. This printing apparatus performs printing based on data transmitted through direct communication from the host device.

Meanwhile, among printing apparatuses of an inkjet printing type, there is a printing apparatus that enables replacement of a print head to be attached thereto. Replacement of the print head may result in a change in a printable color, and the like. In other words, a printable condition with the printing apparatus (hereinafter referred to as a "printability condition") may be changed. Among the printing apparatuses, there is a printing apparatus provided with a function to notify a host device of a change in the printability condition in the case where the change in the printability condition takes place. However, the host device does not always reflect the changed printability condition. In the case where the host device does not reflect the changed printability condition, the printability condition at the printing apparatus disagrees with the printability condition recognized by the host device regarding the printing apparatus. Occurrence of the disagreement brings about a situation where the printing is not properly conducted.

Japanese Patent No. 3919716 describes a technique in which, in the case where a printability condition at a printer is changed, the printer establishes reconnection to a host device and thus causes the host device to obtain the changed printability condition.

However, even if the reconnection is established in accordance with the technique according to Japanese Patent No. 3919716, there still exists a host device that does not obtain the updated printability condition. In particular, various applications (hereinafter referred to as "apps") for printing have been developed in recent years. If such an app is not compatible with a change in a printability condition at a printing apparatus, then a host device does not reflect the changed printability condition. As a consequence, the printability condition recognized by the host device disagrees with the printability condition at the printing apparatus.

SUMMARY I/F THE INVENTION

A printing apparatus according to an aspect of the present invention is a printing apparatus provided with a carriage capable of loading multiple types of print heads, and configured to print an image by causing the carriage to scan a printing sheet. The printing apparatus includes a service providing unit which is configured, in a case where the print head loaded on the carriage corresponds to a first head configuration, to provide a host device with a first printing service using a first identifier to identify the printing apparatus, and in a case where the print head loaded on the carriage corresponds to a second head configuration being different from the first head configuration, to provide the host device with a second printing service using a second identifier being different from the first identifier.

Further features of the present invention will become apparent from the following description of exemplary embodiments with reference to the attached drawings.

BRIEF DESCRIPTION I/F THE DRAWINGS

DESCRIPTION I/F THE EMBODIMENTS

Figure 1:
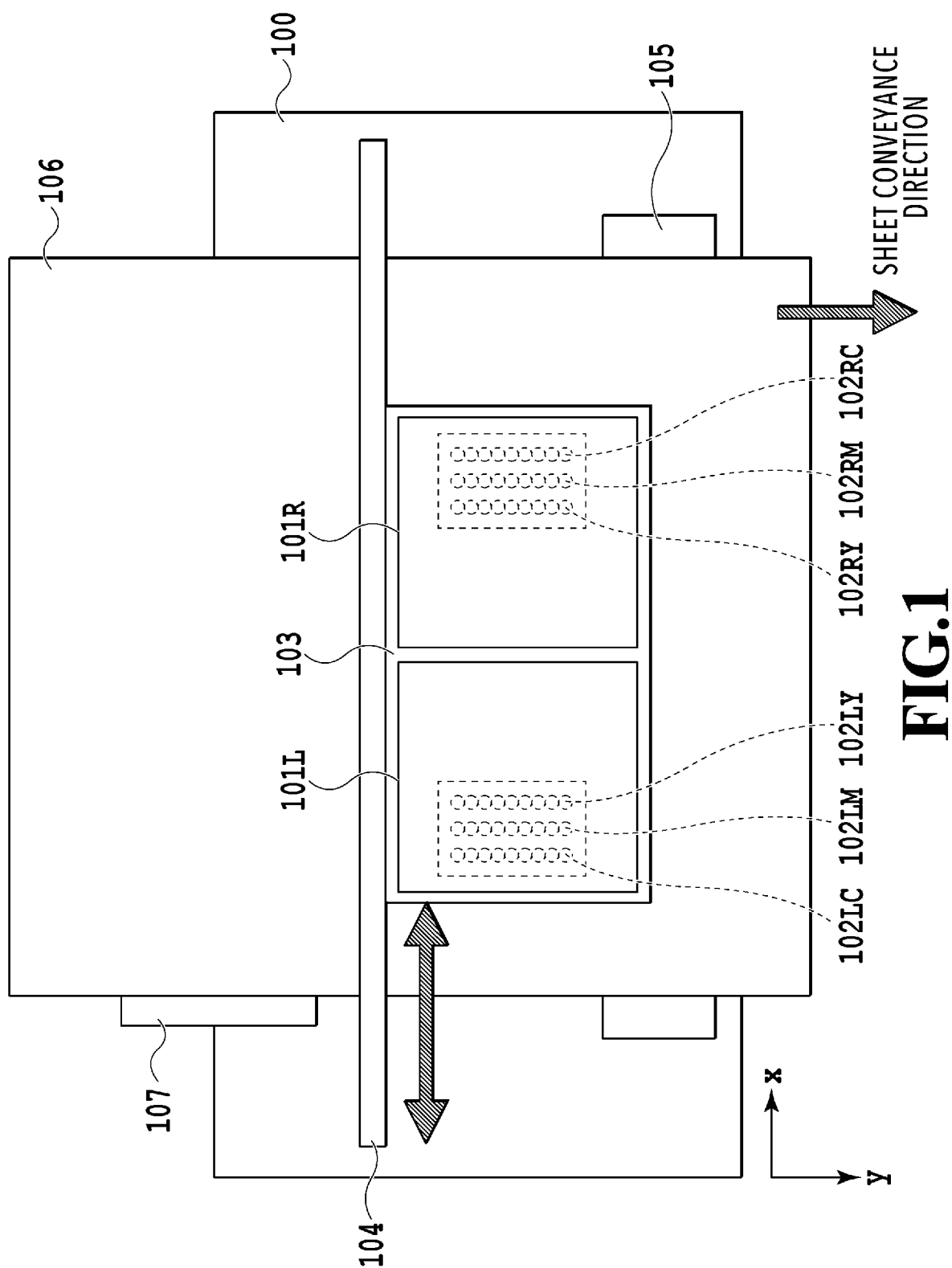
FIG. 1 is a diagram schematically showing an inkjet printer.

Embodiments of the present invention will be described below with reference to the drawings. It is to be noted that the following embodiments are not intended to limit the scope of the present invention. In the meantime, a solution of the present invention does not always require a combination of all the features described in any of the embodiments. Note that identical constituents will be explained while designating identical reference numerals. In addition, relative arrangements, shapes, and other factors of the constituents described in the embodiments are merely exemplary and are not intended to limit the scope of the invention thereto.

First Embodiment

FIG. 1 is a diagram schematically showing an inkjet printer (hereinafter referred to as a "printer") representing an example of a printing apparatus according to an embodiment of the present invention. As shown in FIG. 1, a printer 100 includes a carriage 103 located on a frame that constitutes a constructional material of the printer. The carriage 103 performs reciprocating scanning in an X direction along a guide 104.

A first print head 101L and a second print head 101R can be attached onto the carriage 103. The first print head 101L loads multiple nozzles for ejecting inks. These nozzles form nozzle arrays corresponding to inks of multiple colors. In the example of FIG. 1, the first print head 101L loads a cyan nozzle array 102LC, a magenta nozzle array 102LM, and a yellow nozzle array 102LY. Likewise, the second print head 101R loads multiple nozzles for ejecting inks of the same colors as the inks loaded on the first print head 101L. Specifically, the second print head 101R loads a cyan nozzle array 102RC, a magenta nozzle array 102RM, and a yellow nozzle array 102RY. The first print head 101L and the second print head 101R have the same structure. Specifically, the shape and the configuration of the nozzle arrays of the first print head 101L are the same as those of the second print head 101R. Moreover, the first print head 101L and the second print head 101R are attached to the carriage 103 so as to establish a positional relation that is point-symmetric to each other. Accordingly, in FIG. 1, the cyan nozzle arrays (102LC and 102RC) are located on two ends in a scanning direction (the X direction) in the carriage 103 while the yellow nozzle arrays (102LY and 102RY) are located on an inner side of the carriage 103.

In the printer 100, the nozzles are arranged in a direction (a Y direction) orthogonal to a width direction (the X direction) of a printing sheet 106. The printer 100 is a so-called serial printing type printer, in which the carriage 103 that loads the print heads conducts recording (printing) by performing the scanning in the X direction along the guide 104. A resolution of the nozzle layout of the nozzle array of each ink color is 1200 dpi.

The printer 100 includes a sheet guide 107 located on the left side in plan view of FIG. 1. In the following, if this specification describes the "left side" (or simply the "left") or the "right side" (or simply the "right"), such description represents a left or right positional relation in the applicable drawing in the case of viewing the drawing from the front. Accordingly, in the example of FIG. 1, the sheet guide 107 is provided on the left side of the printer 100.

A conveyance roller 105 (as well as other rollers that are not shown) is rotated by a drive force of a motor (not shown), whereby the printing sheet 106 representing an example of a printing medium to print an image is conveyed in a sheet conveyance direction in FIG. 1 along the sheet guide 107. In the printer 100, a left end of the printing sheet 106 comes into contact with a right end of the sheet guide 107 regardless of the size of the printing sheet 106. As the printing sheet 106 is conveyed to a predetermined position, a printing operation takes place while using the first print head 101L and the second print head 101R. Specifically, inks are ejected from a predetermined number of nozzles in the first print head 101L and a predetermined number of nozzles in the second print head 101R depending on printing data, respectively. Thus, an image equivalent to one scanning width corresponding to the nozzle arrays of the print heads is printed on the printing sheet. After the image equivalent to the one scanning width is printed, the printing sheet 106 is conveyed in the sheet conveyance direction for a width corresponding to the nozzle arrays, and then another image equivalent to one scanning width is printed. An image equivalent to one page, for example, can be printed by repeating the conveyance of the printing sheet 106 and ink ejecting operations from the respective print heads to the printing sheet 106 as described above.

Figure 2:
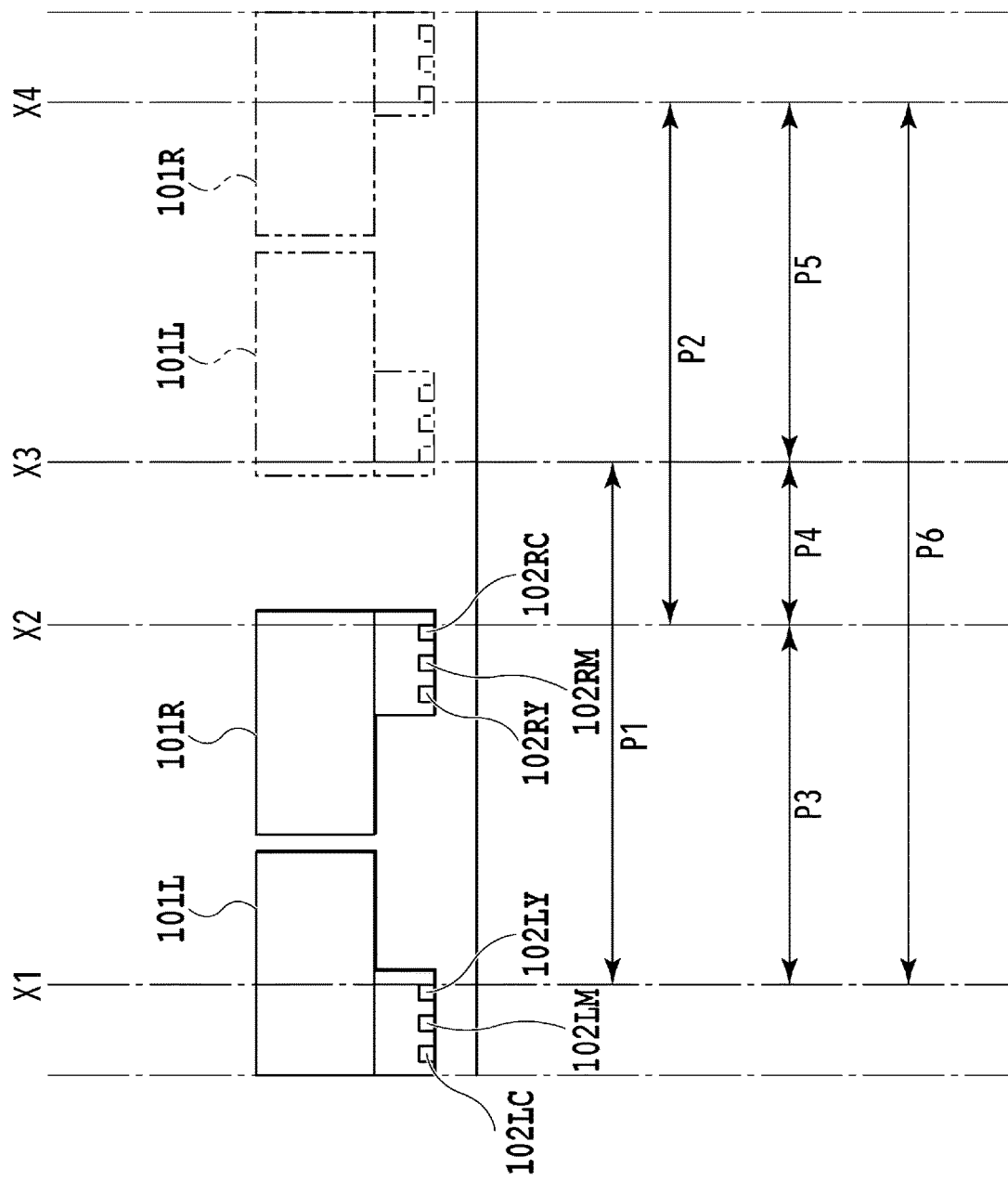
FIG. 2 is a diagram to explain printable regions of print heads.

FIG. 2 is a diagram to explain printable regions of the first print head 101L and the second print head 101R of the printer 100 described in FIG. 1. FIG. 2 illustrates a schematic diagram in the case of viewing the first print head 101L and the second print head 101R in FIG. 1 from sideways, and also illustrates the printable regions. The constituents denoted by the same reference numerals as those in FIG. 2 have the same configurations as those in FIG. 1, and explanations thereof will be omitted. In FIG. 2, positions X1, X2, X3, and X4 represent positions in the X direction on the sheet surface of the printing sheet 106, namely, represent the following positions:

X1=a left end of a region printable by the first print head 101L;
X2=a left end of a region printable by the second print head 101R;
X3=a right end of the region printable by the first print head 101L; and
X4=a right end of the region printable by the second print head 101R.

Meanwhile, in FIG. 2, regions P1 to P6 represent regions in the X direction on the sheet surface of the printing sheet 106, namely, represent the following regions:

P1=the region printable by the first print head 101L;
P2=the region printable by the second print head 101R;
P3=a region printable only by the first print head 101L;
P4=a region printable by both the first print head 101L and the second print head 101R;
P5=a region printable only by the second print head 101R; and
P6=a region printable by at least one of the print heads.

In the printer 100 described in FIG. 1, the region P3 is printed by the first print head 101L. The region P5 is printed by the second print head 101R. The region P4 is printed by both the first print head 101L and the second print head 101R. The following aspects are available for a method of printing the region P4:

1. The entire region P4 is printed 50% by the first print head 101L and 50% by the second print head 101R;
2. A sub-region in the region P4 located on the left side of a predetermined position X is printed by the first print head 101L, and the remaining sub-region on the right side is printed by the second print head 101R; and
3. The percentage of use of the heads is changed stepwise such that the left side of the region P4 is printed by using the first print head 101L more and the right side thereof is printed by using the second print head 101R more.

In this embodiment, widths of the respective regions are as follows:

P1=120 mm;
P2=120 mm;
P4=30 mm; and
P6=210 mm.

Since the A4 size has dimensions of 210×297 mm, it is possible to print a printing sheet of the A4 width by using both the first print head 101L and the second print head 101R. In the meantime, even in the case of using the first print head 101L only, it is possible to print a printing sheet having a size (a photograph size) up to the 4×6 size (about 102 mm×about 152 mm).

Figure 3:
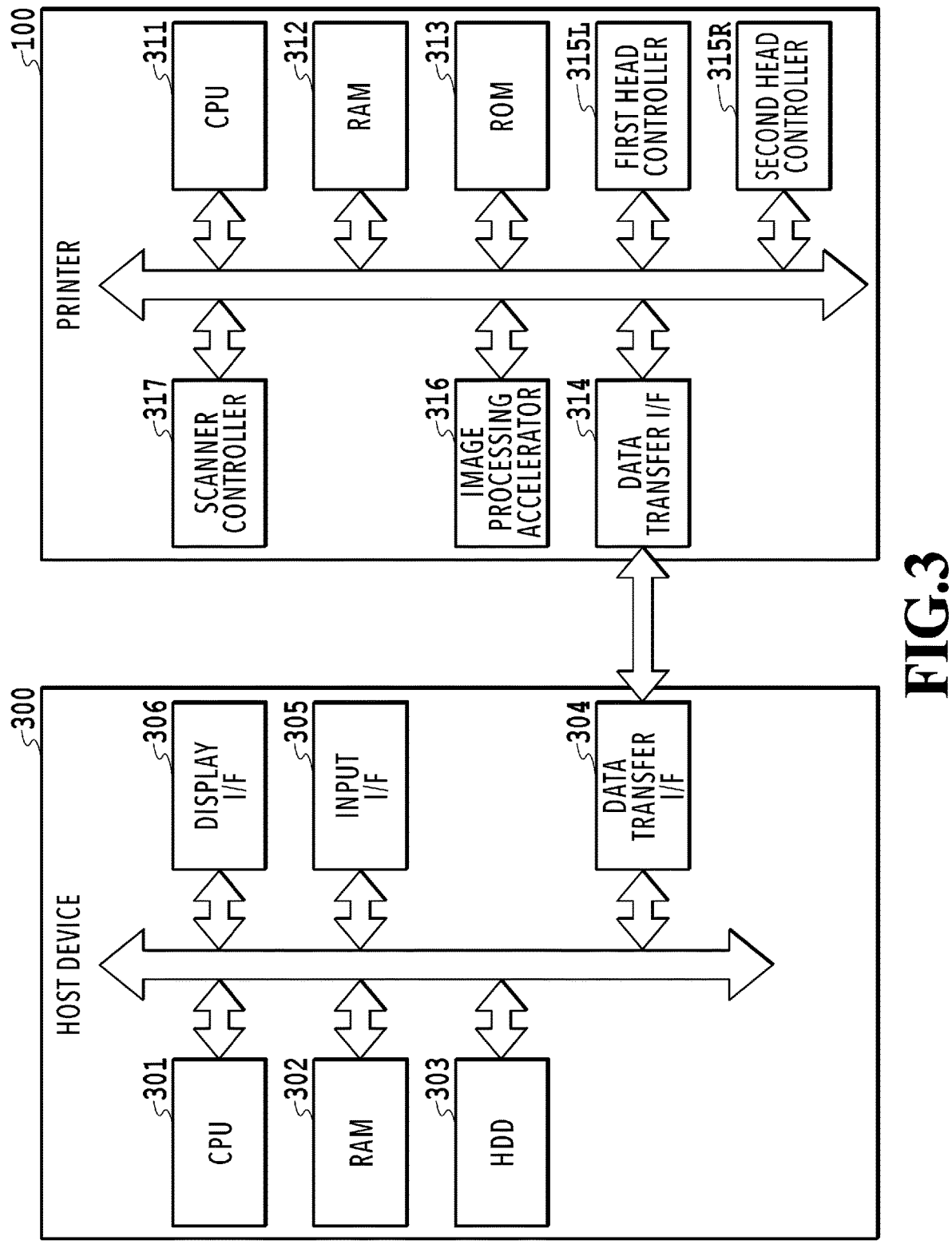
FIG. 3 is a block diagram showing a configuration of a printing system.

FIG. 3 is a block diagram showing a configuration of a printing system of this embodiment. The printing system includes the printer 100 shown in FIG. 1, and a host device 300. Examples of the host device 300 include a computer such as a personal computer, an image capturing device such as a camera, a multifunctional terminal such as a smartphone and a tablet, and so forth.

The host device 300 includes a CPU 301, a RAM 302, an HDD 303, a data transfer I/F (interface) 304, an input I/F 305, and a display I/F 306. The CPU (central processing unit) 301 executes processing in accordance with programs held by the HDD (hard disk drive) 303 and the RAM (random access memory) 302. The RAM 302 is a volatile storage which temporarily holds programs and data. Meanwhile, the HDD 303 is a non-volatile storage which holds programs and data likewise. Moreover, the HDD 303 holds a printer list to be described later. Here, another storage device such as an SDD (solid state drive) may be used as the non-volatile storage. The data transfer I/F 304 controls transmission and reception of data to and from the printer 100. As a connection method for the data transmission and reception, it is possible to use USB (universal serial bus), IEEE 1394, a LAN (local area network), the Internet, and the like. The connection may be wired or wireless. The input I/F 305 is an I/F to control an HID (human interface device) such as a keyboard, a mouse, a touch panel, and the like. A user can perform an input through this I/F. The display I/F 306 controls display on a display unit (not shown). The display unit may be incorporated in the host device 300, or an external display unit may be used instead.

The printer 100 includes a CPU 311, a RAM 312, a ROM 313, a data transfer I/F 314, a first head controller 315L, a second head controller 315R, an image processing accelerator 316, and a scanner controller 317. The CPU 311 executes processing of the respective embodiments to be described later in accordance with programs held by the ROM 313 and the RAM 312. The RAM 312 is a volatile storage which temporarily holds programs and data. Meanwhile, the ROM 313 is a non-volatile storage which can hold programs and table data to be created in the processing of the respective embodiments to be described later.

The data transfer I/F 314 controls transmission and reception of data to and from the host device 300. The first head controller 315L supplies printing data to the first print head 101L shown in FIG. 1, and controls an ejection operation of the first print head 101L. Specifically, the first head controller 315L can be configured to read control parameters and the printing data from a predetermined address in the RAM 312. As the CPU 311 writes the control parameters and the printing data into the predetermined address in the RAM 312, the processing is initiated by the first head controller 315L and ink ejection from the first print head 101L is carried out. Likewise, the second head controller 315R supplies printing data to the second print head 101R shown in FIG. 1, and controls an ejection operation of the second print head 101R. The image processing accelerator 316 is formed from hardware and is configured to execute the image processing faster than the CPU 311. Specifically, the image processing accelerator 316 can be configured to read parameters and data necessary for the image processing from a predetermined address in the RAM 312. Then, as the CPU 311 writes the parameters and the data into the predetermined address in the RAM 312, the image processing accelerator 316 is activated and predetermined image processing is carried out. Here, the image processing accelerator 316 is not an indispensable element, and the image processing can be of course executed only by means of the processing by the CPU 311 depending on the specifications of the printer and the like. The scanner controller 317 controls scan processing.

Figure 4:
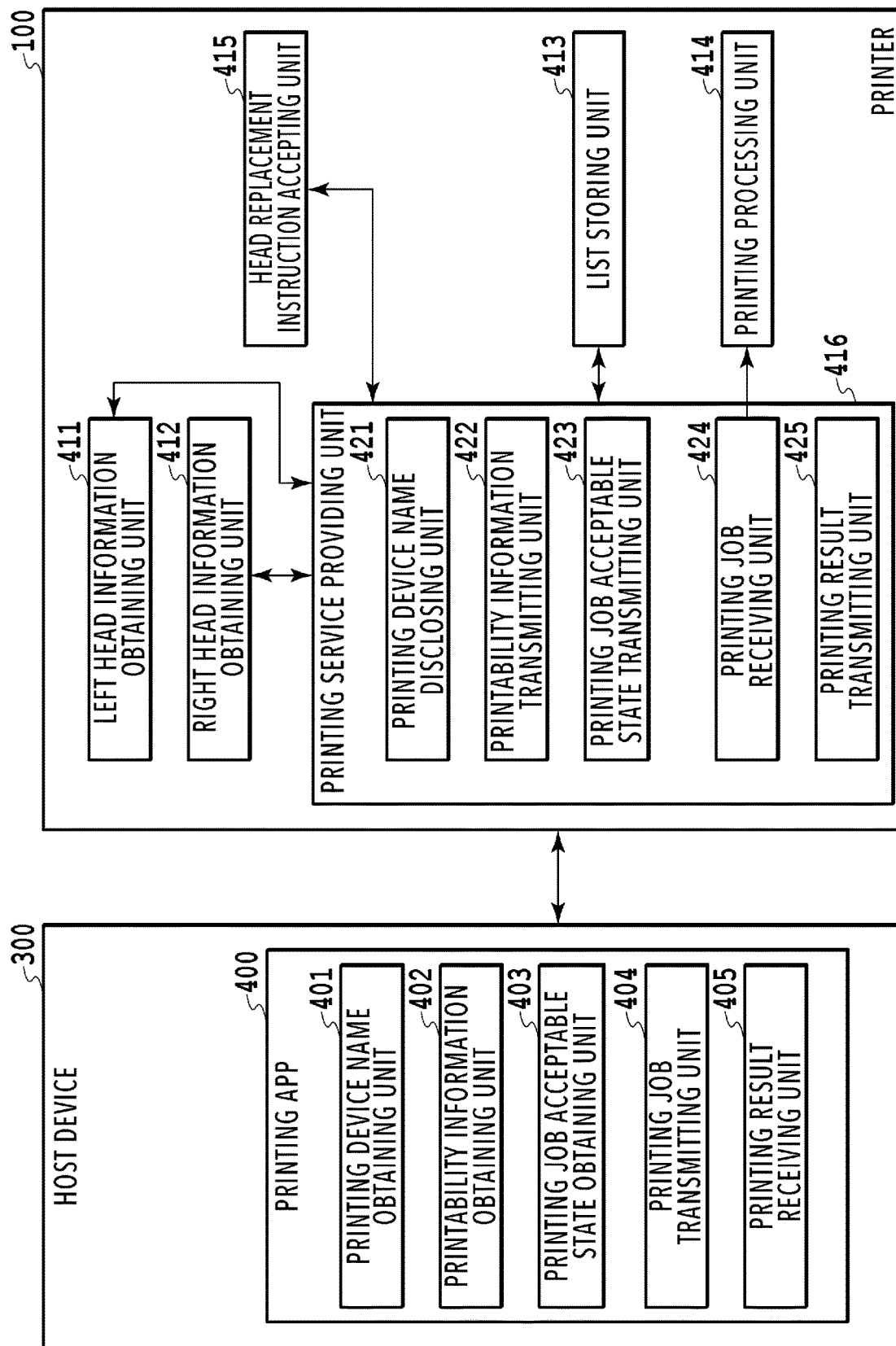
FIG. 4 is a diagram showing functional blocks of the printing system.

FIG. 4 is a diagram showing functional blocks of the printing system shown in FIG. 3. The host device 300 includes a printing app 400. The printing app 400 includes a printing device name obtaining unit 401, a printability information obtaining unit 402, a printing job acceptable state obtaining unit 403, a printing job transmitting unit 404, and a printing result receiving unit 405. The respective units included in the printing app 400 are implemented by the CPU 301 that functions as the respective units of the host device 300 in FIG. 4 as a consequence of the CPU 301 reading the programs stored in the HDD 303 out to the RAM 302 and executing the programs. The printing app 400 is an application for performing direct printing by the printer 100 without using a printer driver. Various applications are provided as the printing app 400 from printer manufacturers, OS (operating system) vendors, and so forth. While a single printing app 400 is shown as an example in FIG. 4, the host device 300 may include multiple printing apps. Other printing apps can also be provided with configurations similar to the printing app 400. The printing app 400 can recognize the presence of the printer 100 on a network by use of network protocols each used for a corresponding printing service.

The printing device name obtaining unit 401 obtains a printing device name of the printer 100. For example, the printing device name obtaining unit 401 obtains the printing device name of the printer 100, which is discovered by searching for a printer available in a network. The printing device name is a name to identify the printer 100. In general, a model number or the like of the printer 100 is used as the printing device name.

The printability information obtaining unit 402 obtains printability information on the printer 100 from the printer 100. The printability information is information concerning printability conditions used for printing by the printer 100 such as the number of colors, a printing sheet type, a printing sheet size, and a printing color mode. The number of colors represents the number of colors of inks usable by the printer 100. The printing sheet type represents the type of the sheet such as plain paper and glossy paper, which is determined based on the inks loaded in the print heads of the printer 100, and so forth. The printing sheet size represents the sheet size printable by the printer 100. The printing color mode represents an available color mode such as a colored mode, a monochrome mode, and a special color (such as metallic) mode.

The printing app 400 conducts the processing for searching for the printer available in the network, for example. At this time, the discovered printer is registered with an available printer list stored (held) in the HDD 303. In the case of registering the printer, the printing device name obtained by the printing device name obtaining unit 401 is used as the name to be displayed on the list, and processing for associating the printability information obtained by the printability information obtaining unit 402 with the printer and registering the associated printability information is conducted. In other words, the HDD 303 stores the printing device name and the printability information associated with each other. Here, among the printing apps 400, there is a printing app designed not to cause the printability information obtaining unit 402 to obtain the printability information again concerning the printer which has already been registered with the available printer list. Alternatively, there is a printing app designed not to update the registered printability information concerning the printer with printability information to be obtained again, because, even if the printability information obtaining unit 402 obtains printability information again, the relevant printability information (other printability information) concerning the printer has already been registered with the printer list. In other words, among the printing apps 400, there is a printing app designed not to rewrite the printability information once stored in the HDD 303. In the above-described printing app 400, if the configuration of the print heads of the printer 100 is changed as described later and the printability information is changed in connection therewith, the change in information will not be reflected therein. As a consequence, the printability condition at the printer 100 disagrees with the printability condition recognized by the printing app 400. According to the processing to be described below, it is possible to reduce occurrence of the disagreement in the printing app 400. Details will be described later.

The description of the respective units of the printing app 400 will be continued.

The printing job acceptable state obtaining unit 403 obtains a printing job acceptable state of the printer 100. If information indicating that it is impossible to accept a printing job is obtained, the printing job transmitting unit 404 does not transmit the printing job to the printer 100. If information indicating that it is possible to accept the printing job is obtained, the printing job transmitting unit 404 transmits the printing job to the printer 100. The printing job transmitting unit 404 transmits the printing job for causing the printer 100 to execute printing by using image data and the like stored in the HDD 303. The printing result receiving unit 405 receives from the printer 100 a processing result of the printing job transmitted from the printing job transmitting unit 404.

Next, the configuration of the printer 100 will be described. The printer 100 includes a left head information obtaining unit 411, a right head information obtaining unit 412, a list storing unit 413, a printing processing unit 414, a head replacement instruction accepting unit 415, and a printing service providing unit 416. The printing service providing unit 416 includes a printing device name disclosing unit 421, a printability information transmitting unit 422, a printing job acceptable state transmitting unit 423, a printing job receiving unit 424, and a printing result transmitting unit 425.

The left head information obtaining unit 411 obtains information (such as a head type ID) on the print head loaded on the left side of the carriage 103. The right head information obtaining unit 412 obtains information on the print head loaded on the right side of the carriage 103. The left head information obtaining unit 411 and the right head information obtaining unit 412 are formed from the first head controller 315L and the second head controller 315R.

The list storing unit 413 is formed from the ROM 313, which stores a head configuration list and stores a printability information list. Details of the head configuration list and the printability information list will be described later.

The printing processing unit 414 executes printing processing based on the printing data transmitted from the printing service providing unit 416. The printing processing unit 414 is formed from the first head controller 315L, the second head controller 315R, the image processing accelerator 316, the CPU 311, and the like.

The head replacement instruction accepting unit 415 accepts an instruction to replace a print head. Moreover, the head replacement instruction accepting unit 415 notifies the printing service providing unit 416 of completion of replacement of the print head.

The printing service providing unit 416 provides a printing service to the printing app 400 of the host device 300. The CPU 311 reads programs stored in the ROM 313 out to the RAM 312, and implements the head replacement instruction accepting unit 415 and the printing service providing unit 416. Thus, the CPU 311 functions as and realizes the head replacement instruction accepting unit 415 and the printing service providing unit 416 (as well as the respective units included in the printing service providing unit 416).

The printing device name disclosing unit 421 discloses the printing device name to respective host devices including the host device 300. The printability information transmitting unit 422 transmits the printability information to the respective host devices including the host device 300. The printing job acceptable state transmitting unit 423 transmits a printing job acceptable state to the respective host devices including the host device 300. Each of the printing device name disclosing unit 421, the printability information transmitting unit 422, and the printing job acceptable state transmitting unit 423 may transmit the information to the host device 300 in the form of a push type, or transmit the information to the host device 300 in the form of a pull type. Specifically, the printing service providing unit 416 can actively transmit the information to the printing app 400 in the form of broadcasting, for example (the push type). Alternatively, the printing service providing unit 416 may transmit the information to the host device 300 in the case of being requested by the printing app 400 (the pull type).

The printing job receiving unit 424 receives the printing job from the host device 300. The printing job receiving unit 424 requests the printing processing unit 414 for the printing processing of the received printing job. The printing result transmitting unit 425 transmits a printing result of the printing job accepted by the printing job receiving unit 424 to the host device 300.

Figure 5:
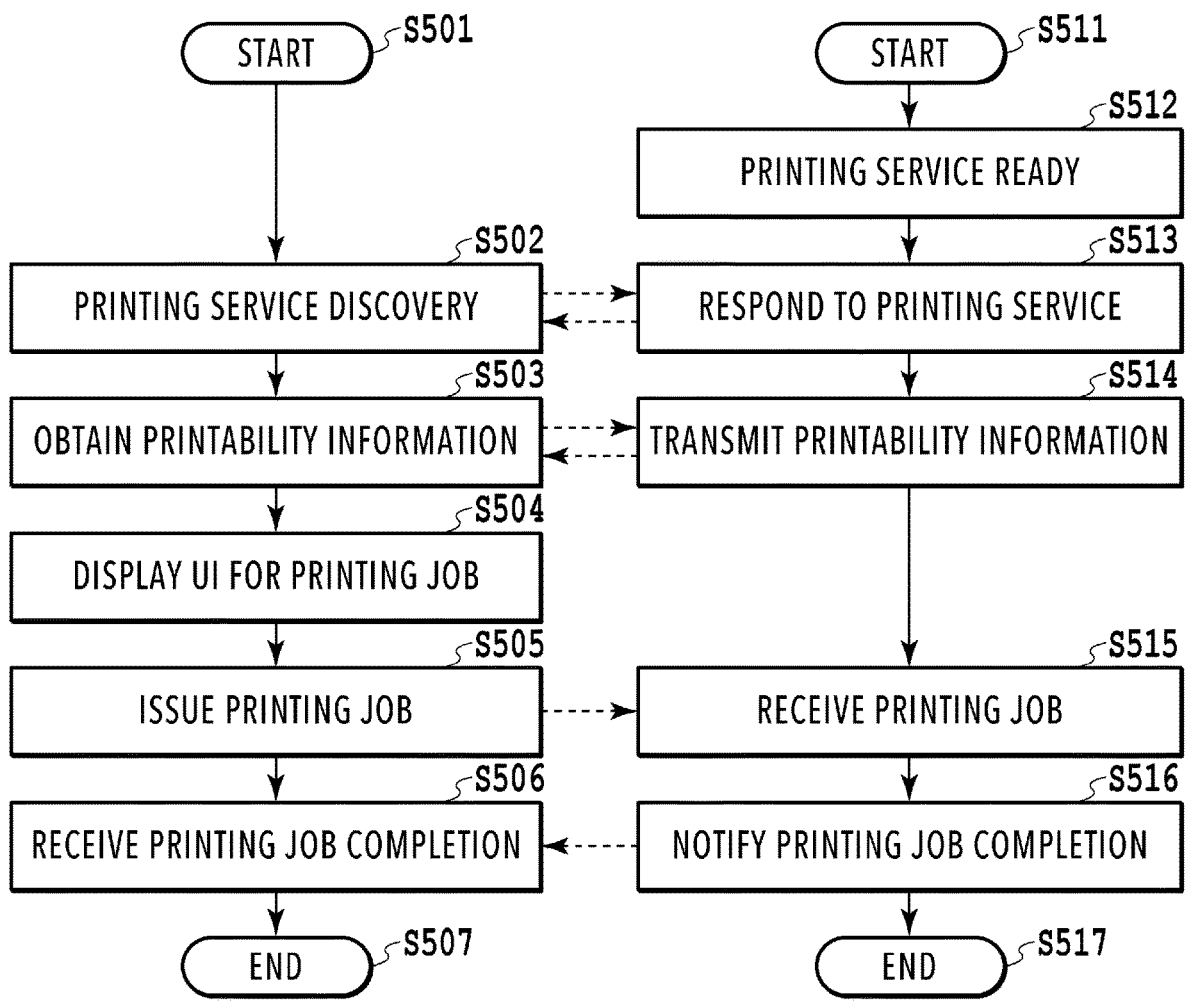
FIG. 5 is a diagram showing a processing sequence between a host device and a printer.

FIG. 5 is a diagram showing an example of a processing sequence between host device 300 and the printer 100 in the case of carrying out the printing service. In FIG. 5, steps S501 to S507 represent the processing by the host device 300. Steps S511 to S517 represent the processing by the printer 100. In step S501, the processing by the host device 300 is started. For example, a user initiates the printing app 400, thereby starting the processing. In step S511, the processing by the printer 100 is started.

In step S512, the printing service providing unit 416 of the printer 100 confirms that the printer 100 is printable, and starts the printing service. Specifically, the printing service providing unit 416 sets a state of the printer 100 to a Ready state.

In step S502, the printing app 400 of the host device 300 carries out a printing service Discovery. In step S513, the printing service providing unit 416 responds to the printing service Discovery, and notifies that the printer 100 is an apparatus that can provide the printing service. At this time, the printing service providing unit 416 notifies the host device 300 of the printing device name of the printer 100.

In step S503, the printing app 400 of the host device 300 obtains the printability information. In the case where the printer 100 is an unknown device, the printing app 400 inquires at the printer 100 about the printability information. Then, the printing app 400 obtains the printability information which is transmitted from the printer in step S514 in response to the inquiry. Meanwhile, in the case where the printer 100 is a known device, the printing app 400 obtains the printability information which is registered with and held by the printing app 400 that has been obtained already. In other words, if the printer 100 is the known device, the printing app 400 does not obtain the printability information from the printer 100.

In step S504, the host device 300 constructs and displays a user interface (UI) for creating the printing job based on the printability information obtained in step S503. Specifically, based on the printability information on the printer 100, the host device 300 performs display control of the UI including a display that is suitable for the printer 100 such as a printing size, a printable sheet size, a printable sheet type, a used ink type, and the like, as well as a display of options suitable for the printer 100. Here, if there is a change in the printability condition of the printer 100 and the host device 300 does not obtain the printability information from the printer 100 in the processing in step S503, the details of the change are not reflected in step S504. In other words, the UI not suitable for the printer 100 may be displayed. As a consequence, a printing job that disagrees with the current printability condition of the printer 100 may be constructed. In the processing of this embodiment described below, a technique for suppressing the occurrence of the disagreement will be explained.

In step S505, the host device 300 issues a printing job. In step S515, the printer 100 receives the printing job and performs the printing. As the printing of the printer 100 is completed, the printer 100 notifies the host device 300 of completion of the printing in step S516. In step S506, the host device 300 receives the printing completion notification. The printing app 400 displays the completion of the printing. Then, the host device 300 proceeds to step S507 and the printer 100 proceeds to step S517, respectively, and the series of the printing service processing is completed.

Note that the processing of FIG. 5 explains the aspect of the pull type in which host device 300 sends a request to the printer 100 and the printer 100 responds to the request. However, as mentioned previously, the processing may take the form of a so-called push type in which the printer 100 voluntarily transmits information to the host device 300 (as well as not-illustrated other host devices) present on the network.

Next, a description will be given of an example in which different print heads are loaded on the carriage 103 of the printer 100.

Figure 6:
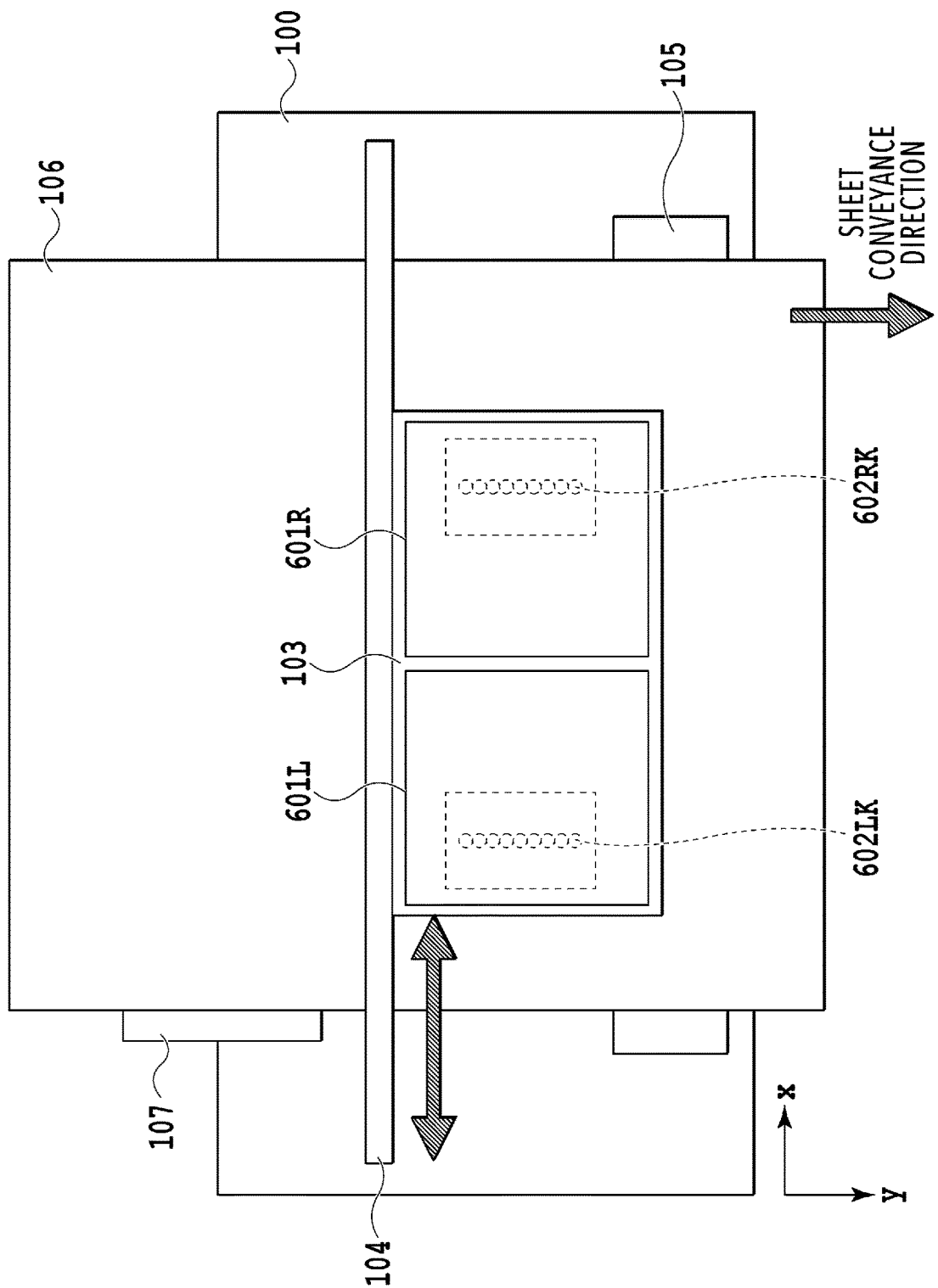
FIG. 6 is a schematic diagram of a printer loading black print heads.

FIG. 6 is a diagram in which the printer 100 illustrated in FIG. 1 loads a third print head 601L and a fourth print head 601R, each of which loads only a black ink. The third print head 601L and the fourth print head 601R have the same shape and the same size as the first print head 101L and the second print head 101R and can replace the print heads on the carriage 103. In FIG. 6, configurations other than the third print head 601L and the fourth print head 601R are the same as those in FIG. 1 and explanations thereof will therefore be omitted.

The third print head 601L loads a black nozzle array 602LK for ejecting the ink. Likewise, the fourth print head 601R also loads a black nozzle array 602RK for rejecting the ink of the same color as the ink loaded on the third print head 601L.

In the case where the printer 100 loads the first print head 101L and the second print head 101R capable of performing color printing, the printer 100 can perform monochrome printing and color printing. Meanwhile, in the case where the printer 100 loads the third print head 601L and the fourth print head 601R, the printer 100 can perform the monochrome printing. Here, in order to express the black in the course of performing the monochrome printing or the color printing by using the three colors of CMY inks, then so-called composite-black processing may be conducted so as to express the gray and black by printing in the three colors while changing proportions of the inks as appropriate.

Figure 7:
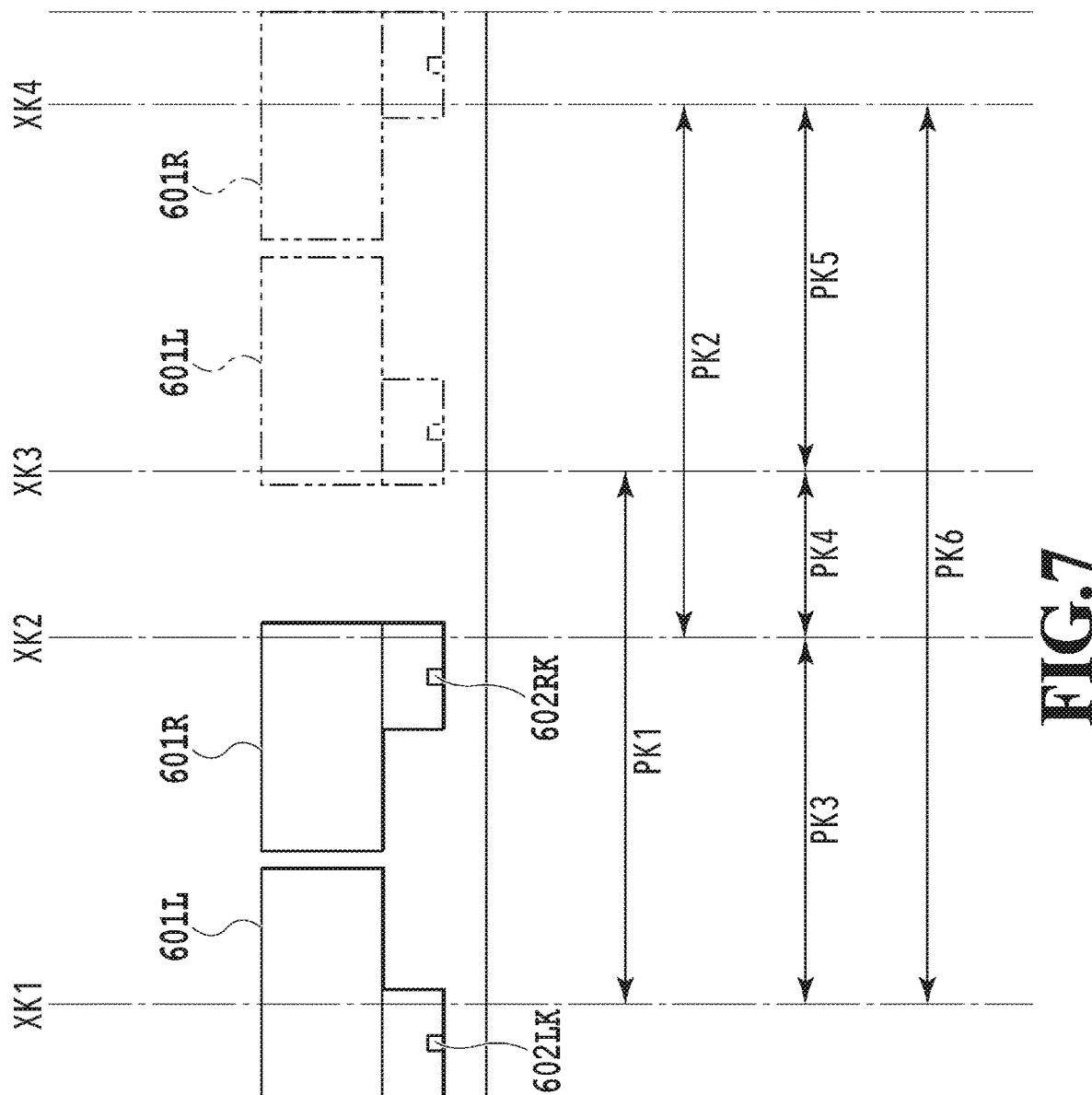
FIG. 7 is a diagram to explain printable regions of print heads.

FIG. 7 is a diagram to explain printable regions of the third print head 601L and the fourth print head 601R of the printer 100 described in FIG. 6. FIG. 7 illustrates a schematic diagram in the case of viewing the third print head 601L and the fourth print head 601R in FIG. 6 from sideways, and illustrates the printable regions.

Positions XK1 to XK4 and regions PK1 to PK6 in FIG. 7 are assumed to be the same as the positions X1 to X4 and the regions P1 to P6 in FIG. 2. Here, in a strict sense, it is possible to apply a different setting from that in FIG. 2. Specifically, assuming that P is a distance between the cyan nozzle array 102LC and the yellow nozzle array 102LY loaded on the first print head 101L, then it is also possible to apply the following settings:

$PK1=P1+P;$ $PK2=P2+P;$ $PK4=P4+P;$ and $PK6=P6+P.$

Although the aspect of using the print heads of the same type (either CMY or black only) for the right and left print heads has been described, the present invention is not limited only to this configuration. One of the print heads may be a print head of a different type from the other print head. Meanwhile, one of the print heads may not be loaded instead. In any of these conditions, the printer 100 can perform the printing on the printing sheet.

Next, a description will be given of processing in the case of replacing the print heads loaded on the printer 100. If the loaded print heads are replaced, the printability condition of the printer 100 may be changed accordingly. The following scene assumes a case in which the print heads loaded on the printer 100 are replaced after the printer 100 establishes connection to the host device 300. In other words, the following scene assumes a case in which the print heads loaded on the printer 100 are replaced in the case where the printing app 400 of the host device 300 has registered the printer 100 already. In the case where the print heads are replaced as described above, this embodiment performs processing for reducing the chance of causing the host device 300 to issue the printing job under a printing condition that cannot be dealt with the printer 100. In other words, a description will be given of an aspect where the printer 100 performs such processing with which the printability condition changed at the printer 100 is reflected at the host device 300.

Table 1 is a head configuration list showing combinations of a left-hand loaded head (also referred to as a "left head") and a right-hand loaded head (also referred to as a "right head") to be loaded on the printer 100, and printing modes and printable sizes available for printing in these combinations. Here, as mentioned previously, the printer 100 is provided with the sheet guide 107 located on the left side. Accordingly, the left head is supposed to be always used at the time of ordinary printing.

TABLE 1

Head Configuration List of First Embodiment

| Configuration Number | Left-hand Loaded Head | Right-hand Loaded Head | Color Printing Width | Monochrome Printing Width |
|---|---|---|---|---|
| 1 | color | color | 210 mm | 210 mm |
| 2 | black | black | NA | 210 mm |
| 3 | color | none/black | 120 mm | 120 mm |
| 4 | black | none/color | NA | 120 mm |

In view of Table 1, the printer 100 has the following characteristics depending on the combinations of the types of the loaded print heads. Here, a color print head is a print head provided with the CMY nozzle arrays such as the first print head 101L. Meanwhile, a black print head is a print head provided only with the black nozzle array such as the third print head 601L:

- If the left head is the color print head, then it is possible to perform both the color printing and the monochrome printing (see configuration numbers 1 and 3);
- If the left head is the black print head, then it is not possible to perform the color printing but is possible to perform the monochrome printing (see configuration numbers 2 and 4);
- If the right head and the left head are of the same type, then it is possible to print up to 210 mm by using both of the right and left print heads (see the configuration numbers 1 and 2); and
- If the right head is of the different type from that of the left head, then it is possible to print up to 120 mm by using the left print head without using the right head (see the configuration numbers 3 and 4).

Here, the head configuration list of Table 1 represents a list applicable to a case in which the sheet guide 107 is provided on the left side of the printer 100. In the case where the sheet guide 107 is provided on the right side of the printer 100, then it is possible to use another head configuration list created based on the type of the right head as the standard.

Figure 8:
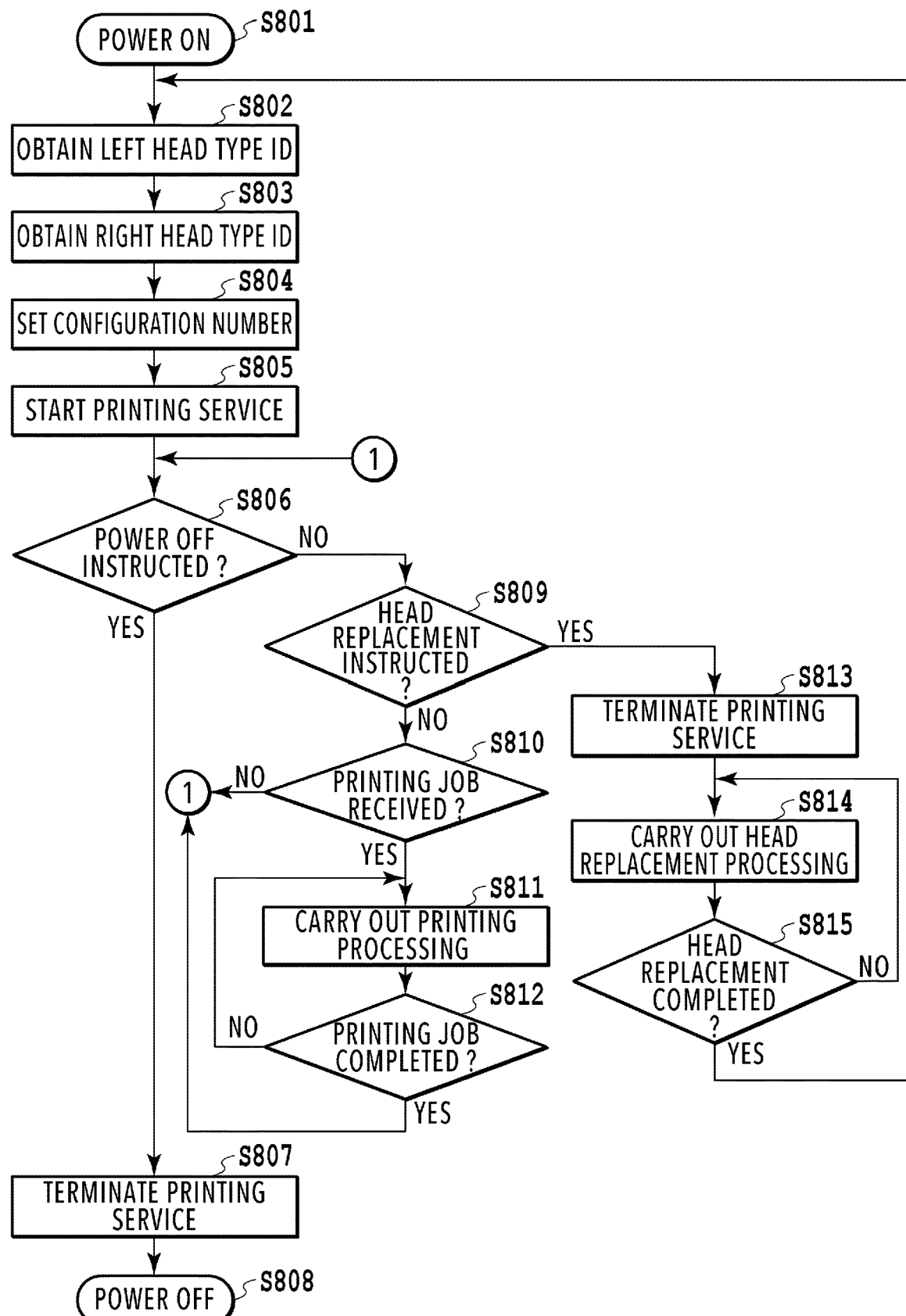
FIG. 8 is a flowchart to explain a processing flow of a printer.

FIG. 8 is a flowchart for explaining the processing by the printer 100 of this embodiment. In the processing to be described below, the printer 100 is assumed to be in the state of the configuration number 1 on Table 1 in an initial state. In other words, the color print heads are assumed to be loaded as the right and left print heads on the carriage 103 (i.e., representing the configuration illustrated in FIG. 1).

First, power-on processing of the printer 100 is executed in step S801. Thus, power is supplied to the respective units in the printer 100.

Next, in step S802, the left head information obtaining unit 411 obtains a type ID of the left side print head loaded on the carriage 103. The type ID is obtained by reading a prescribed component value of the print head, for instance. By obtaining the type ID, it is possible to specify whether the left side print head is the color print head or the black print head. Here, the type ID of the left head turns out to be "color". The type ID of the left head thus obtained is provided to the printing service providing unit 416.

Next, in step S803, the right head information obtaining unit 412 obtains a type ID of the right side print head loaded on the carriage 103. Here, the type ID of the right head turns out to be "color". The type ID of the right head thus obtained is provided to the printing service providing unit 416.

Next, in step S804, the printing service providing unit 416 refers to the head configuration list stored in the list storing unit 413 by using the type ID of the left head and the type ID of the right head, and sets up the configuration number of the printer 100. Specifically, the configuration number is set up based on the type IDs of the right and left heads obtained in steps S802 and S803 and on the head configuration list of Table 1. Here, the configuration number turns out to be "1" as mentioned previously.

Next, in step S805, the printing service providing unit 416 starts the printing service to the external host device 300. This step includes the following processing:

- disclosure of the "printing device name" to the host device 300;
- transmission of the "printability information" in response to the inquiry from the host device 300;
- transmission of the "printing job acceptable state" in response to the inquiry from the host device 300; and
- transmission of a "printing device status" in response to the inquiry from the host device 300.

As described above, the disclosure and transmission of these pieces of information may be carried out in the form of the push type or the pull type. Generally, in the case where the printing app 400 of the host device 300 registers the printer 100 for the first time, the host device 300 inquires at the printer 100 about the printability condition. Then, the host device 300 registers the printability condition with the printing app 400 based on the "printability information" transmitted from the printer 100.

Table 2 is a list of the printability information corresponding to the head configuration list of Table 1. The configuration numbers on Table 1 correspond to configuration numbers on Table 2, respectively. As shown in Table 2, in this embodiment, if the head configurations of the print heads (the combination of the right and left print heads) are different, then the printer 100 discloses the printing device names different from each other. Specifically, if the configurations of the loaded heads are changed, the printer 100 discloses the printing device names corresponding to the changed head configurations. For this reason, the host device 300 is expected to execute processing as if it is in the case of discovering a new different printer. In other words, as the printing app 400 of the host device 300 discovers a new available printer, the printing app 400 acquires the printability information on that printer and executes the processing for setting the printability condition on the printer. For this reason, it is possible to reduce the occurrence of the disagreement between the printability condition of the printer and the printability condition recognized by the host device 300 (the printing app 400).

TABLE 2

Printing Device Names and Printability Information of First Embodiment

| Configuration Number | Printing Device Name | Printability Information | | |
|---|---|---|---|---|
| | | Printing Colors | Printing Width | Ink |
| 1 | PRINTER_CMY_A4 | BK & COLOR | 210 mm | 3 COLORS: CMY |
| 2 | PRINTER_K_A4 | BK | 210 mm | 1 COLOR: K |
| 3 | PRINTER_CMY_4x6 | BK & COLOR | 120 mm | 3 COLORS: CMY |
| 4 | PRINTER_K_4x6 | BK | 120 mm | 1 COLOR: K |

In the processing of step S805, the printing service providing unit 416 discloses and transmits the "printing device name" and the "printability information" stated on Table 2 based on the configuration number that is set up in step S804. In the above-described example, the configuration number is "1". Accordingly, the "printing device name" and the "printability information" to be disclosed and transmitted are as follows:

the printing device name: PRINTER_CMY_A4;
the printability information:
the printing colors=BK & COLOR;
the printing width=210 mm; and
the ink=3 colors: CMY.

The various pieces of the printability information thus transmitted are used as the printability conditions as follows by the host device 300, for example:

the printing colors: options selectable by the host device 300 in the case of selecting the printing mode;
the printing width: an option selectable by the host device 300 in the case of selecting the printing sheet size; and
the ink: the number of inks in the case where the host device 300 indicates ink residual amounts and the like.

The printability information to be transmitted from the printer 100 to the host device 300 is not limited only to the above-described example. In addition, depending on the information on the colors and the inks, information such as the printing color mode, the printing sheet type, and the like may also be transmitted as the printability information to the host device 300. Of the items included in the printability information, the host device 300 can arbitrarily set as to which items are to be used as the printability information. In the meantime, the printer 100 may transmit only the information on the items inquired from the host device 300 as the printability information.

Meanwhile, in the processing of step S805, the printing service providing unit 416 may receive an inquiry from the host device 300 about a status of the printing device. Specifically, there may be a case in which the host device 300 transmits a status inquiry command which inquires about the status of the printing device. This status inquiry command includes the printing device name. In the case of receiving the status inquiry command, the printing service providing unit 416 responds the status of the printing device (a printer status) to the host device 300 based on the printing device name included in the command. Specifically, if the printing device name included in the command matches the printing device name currently providing the service, the printing service providing unit 416 responds the status of the printing device to the host device 300. For instance, the configuration number is "1" in the above-described example. Accordingly, the printing service providing unit 416 responds the status of the printing device to the host device 300 if the printing device name included in the status inquiry command is "PRINTER_CMY_A4". For example, as the status of the printing device, the printing service providing unit 416 transmits a message "IDLE" representing that the printing device is capable of printing, or a message "BUSY" representing one of printing unacceptable statuses, as the response. On the other hand, if the printing service providing unit 416 receives the status inquiry command that includes a different configuration such as the printing device name "PRINTER_K_A4", the printing service providing unit 416 does not send any response. As described above, since the printer 100 does not send any response, the host device 300 can learn that the printer of the relevant configuration (the configuration identified by the printing device name "PRINTER_K_A4") is not available. As a consequence, the host device 300 can demonstrate the status of the target printer to the user by changing a color of an icon corresponding to the printer corresponding to the printing device status, or by indicating a text such as "not available". The example described herein is configured such that the printer 100 causes the host device 300 to recognize the unavailable status by not sending any response to the status inquiry command. However, the present invention is not limited only to this example. The printer 100 may notify the host device 300 of the unavailable status by a different method such as transmission of an error status as the response.

Next, in step S806, the printer 100 determines whether or not power-off is instructed. If the power-off is instructed, the processing proceeds to step S807. In step S807, the printing service providing unit 416 terminates the printing service. For example, the printing service providing unit 416 cuts off communication using a network protocol used in the printing service. Thereafter, the processing proceeds to step S808 where the printer 100 performs power-off processing and then terminates the flow.

On the other hand, if the power-off is not instructed in step S806, the processing proceeds to step S809.

In step S809, the head replacement instruction accepting unit 415 determines whether or not the head replacement instruction is accepted. If the head replacement instruction is not accepted, the processing proceeds to step S810. In step S810, the printing service providing unit 416 determines whether or not the printing job is received from the host device 300. If the printing job is not received, the processing proceeds to step S806 and then the above-described processing is repeated. If the printing service providing unit 416 determines that the printing job is received in step S810, the processing proceeds to step S811.

In step S811, the printing processing unit 414 carries out the printing processing of the printing job notified from the printing service providing unit 416. At this point, the printer 100 has never caused any change in the printability condition. Accordingly, there is no chance of occurrence of the disagreement with the printing job transmitted from the host device 300.

Next, in step S812, the printing processing unit 414 determines whether or not the printing processing of the received printing job is completed. The processing in step S811 is carried out until the printing processing is completed. If the printing processing is determined to be completed, the processing proceeds to step S806 and then the above-described processing is repeated. On the other hand, if the head replacement instruction is accepted in step S809, the processing proceeds to step S813.

In step S813, the printing service providing unit 416 terminates the printing service along with a start of head replacement processing. For example, the printing service providing unit 416 cuts off the communication using the network protocol used in the printing service. At this point, the printer 100 is no longer recognized as the available printing device by the external host device 300.

Next, in step S814, the printer 100 carries out the head replacement processing. For example, the carriage 103 is moved to a head replacement position. Then, any of the heads loaded on the carriage 103 is replaced with a new head by the user. This embodiment will describe an example of replacing both the right and left print heads with the black print heads.

Next, in step S815, the printer 100 determines whether or not the head replacement processing is completed. Specifically, the printer 100 determines the completion of the head replacement processing as the user loads the print heads on the carriage 103 and then presses a head replacement completion button or the like. The processing in step S814 is performed until the head replacement processing is completed. The processing returns to step S802 in the case of the determination that the head replacement processing is completed. Thereafter, the processing is continued.

As described above, the printing service is terminated if there is the head replacement instruction. Then, after the head replacement is performed, the above-described processing including the processing for obtaining the head type ID will be performed again. In the above-described example, the head type IDs obtained in the repeated steps S802 and S803 are different from those having been obtained in the earlier steps S802 and S803. For this reason, the information to be obtained in the respective steps will be different in the following perspectives:

(Information obtained in the repeated steps)
Step S802 *the type ID of the left head="black";
Step S803 *the type ID of the right head="black";
Step S804 *the configuration number="2";
Step S805 *the printing device name: PRINTER_K_A4;
*the printability information
the printing color=BK;
the printing width=210 mm; and
the ink=1 color: K.

In this embodiment, as shown in Table 2, the printing device names vary depending on the configurations of the heads. Accordingly, in the repeated step S805, if the printing service is started by using the replaced head configuration, the printing service to the external host device 300 is started while changing (updating) not only the printability information but also the printed device name. In the case of not changing the printing device name, that is, if only the printability information is changed while keeping the printing device name unchanged, then the host device 300 continues to recognize the printing device as the printing device that has already been registered. The host device 300 may not obtain the printability information again regarding the printing device that has been registered, and may cause the disagreement of the information. According to this embodiment, if the head configuration is changed, the printer 100 uses a different printing device name. In this way, it is possible to cause the host device 300 to recognize that the printing device is different and to obtain the printability information.

The above-described example has explained the aspect of replacing the print heads in the same printer 100. However, the present embodiment is also useful in the case of using multiple printers 100 of the same model number. For instance, in the case where a printer 100X and a printer 100Y are of the same model number, then the printers may take the same printing device name. On the other hand, the printer 100X is assumed to be a printer for the monochrome printing provided with the print head configuration as shown in FIG. 6 and the printer 100Y is assumed to be a printer for the color printing provided with the print head configuration as shown in FIG. 1, for example. In this case, if the host device 300 registers the printer 100X in the beginning, then the printer having that printing device name is continuously recognized as the printer for the monochrome printing. Accordingly, even if the printer 100X is disconnected from the network and the printer 100Y is newly connected thereto, the host device 300 may continuously recognize the printer 100Y as the printer for the monochrome printing. Thus, the disagreement of the printability information may occur. As described above, there may be the case in which the disagreement occurs not only by the change of the head configuration of the same printer 100 but also by the switching of the connection of the printers 100 of the same model number.

In the processing of this embodiment, if the head configuration of the print heads after the replacement is changed from the head configuration of the print heads before the replacement, the printing device name is also changed in accordance with the change in the head configuration. For this reason, the external host device 300 recognizes that the printing service is started by the "unknown new device". Accordingly, the host device 300 obtains the printability information corresponding to the changed head configuration whereby the disagreement does not occur. In the meantime, in the case where the user further changes (returns) the head configuration again to the configuration number "1", the printer 100 is recognized again as the "known color printing device". The printability information at the time of recognition is the same as the printability information that has been registered already. Accordingly, the disagreement in the printability information does not occur between the printer 100 and the host device 300.

Meanwhile, in the processing of this embodiment, upon receipt of the status inquiry command from the host device 300, the printer 100 performs the processing to respond to the host device 300 based on the printing device name included in the command. Among the host devices 300, there is a host device which continues the storage of the information on the printing device. For this reason, even if the printing device name of the printer 100 is changed, the host device 300 may be in the state of being capable of selecting the printing device name before the change. Accordingly, the host device 300 may issue the printing job based on the printability information corresponding to the printing device name before the change. As in the above-described embodiment, as the printer 100 performs the response based on the device name included in the status inquiry command, the host device 300 can recognize a valid printing device name or an invalid printing device name of the printer 100. As a consequence, the host device 300 can demonstrate the validity or invalidity of the printing service corresponding to the printability information on the printer 100 more reliably to the user operating the host device 300. In this way, it is possible to reduce the chance of issuing the printing job based on the printability information corresponding to the printing device name before the change, and thus to diminish the risk of occurrence of the disagreement with the printing job.

Note that all the printing device names in Table 2 include "PRINTER_" in common. In other words, at least front parts of the printing device names coincide with one another. This is due to the following reason. Specifically, in the case where there are multiple printers 100, for example, the printers 100 are displayed serially on a printer list on the host device side so as to allow easy selection by the user. In other words, if there are multiple printers 100 of the same model number and the head configurations of the printers are different from one another, the printers are displayed with different printing device names on the printer list on the host device side. The printing device names preferably have common portions. For example, the printing device names preferably include a machine type name and the like in common.

As described above, in this embodiment, in the case where the head configuration is changed as a result of replacing the print head, the printing device name is also updated. Accordingly, the host device 300 recognizes the unknown new device. Thus, it is possible to cause the host device 300 to reflect the printability information. As a consequence, it is possible to reduce the chance of occurrence of the disagreement between the printing job issued by the host device 300 and the printability condition of the printer 100.

Note that this embodiment has described the aspect of changing the printing device name as an example. However, the present invention is not limited only to this aspect. In another aspect, a parameter may be changed as long as the host device 300 (the printing app 400) is likely to recognize the parameter as pertaining to a new printer. For example, in a printing service using a network protocol such as "Bonjour", "WSD (Web Services on Devices)", and "UPnP", an identifier used for recognizing a device may be changed. In other words, if the head configuration is changed in the case where a first printing service using a first identifier is being provided, then a second printing service using a second identifier may be provided instead.

Second Embodiment

The first embodiment has described the aspect in which, the printer 100 stops the printing service to the host device 300 in the case of accepting the head replacement instruction, then cuts off the connection to the host device 300, and starts the printing service anew after the head replacement. However, the head replacement is carried out not only in the case of replacement with the print heads of different types. For example, if a print head formed integrally with an ink tank is used, there is possibly as aspect of replacing the print head which runs out of the ink. In the case of the processing described in the first embodiment, the connection to the host device 300 will be cut off if the ink runs out while the user is carrying out a printing job for a large number of pages and the replacement with a new print head of the same type is required. Here, the printing job is aborted as a consequence.

Accordingly, the second embodiment will describe an aspect of performing processing based on a result of determination as to whether head replacement conducted by the user is head replacement corresponding to ink runout or head replacement intended to change the printability condition. Note that the configurations of the printer 100 and the host device 300 are the same as those described in the first embodiment and explanations thereof will be omitted.

Figure 9:
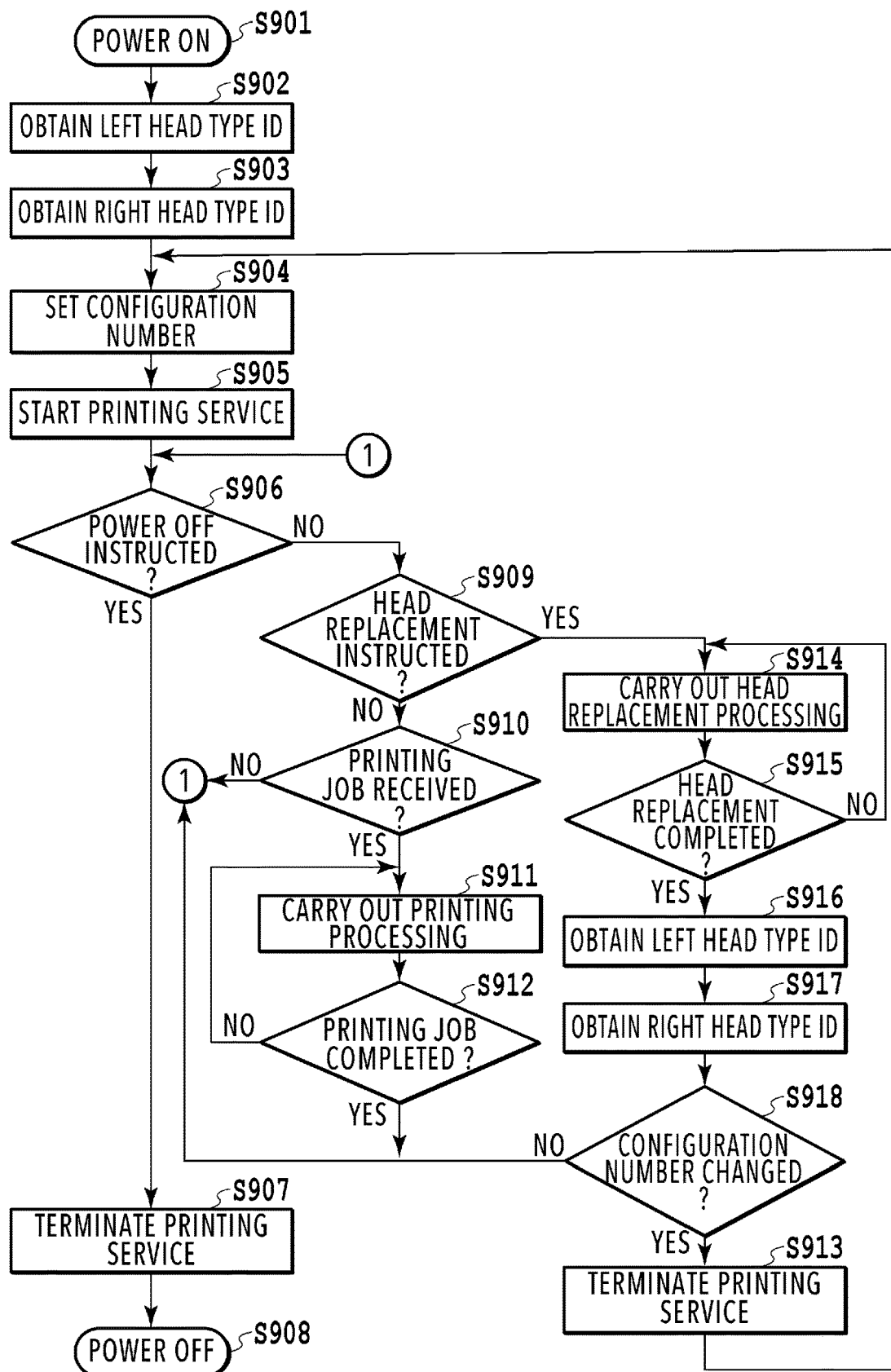
FIG. 9 is a flowchart to explain another processing flow of a printer.

FIG. 9 is a flowchart for explaining the processing of this embodiment. In this embodiment as well, the initial state of the printer 100 is assumed to be of the head configuration of the configuration number "1" in Table 1. Steps S901 to S912 are the same processing as steps S801 to S812 in FIG. 8, and explanations thereof will be omitted.

In the first step S905 of this embodiment, the information on the printer 100 to be transmitted to the external host device 300 is the same as that in the first step S805 of the first embodiment, which is as follows:
  the printing device name: PRINTER_CMY_A4;
  the printability information:
    the printing colors=BK & COLOR;
    the printing width=210 mm; and
    the ink=3 colors: CMY.

In this embodiment, if it is determined in step S909 that the head replacement instruction is accepted, the processing proceeds to step S914.

In steps S914 and S915, the head replacement processing is performed as with the processing in steps S814 to S815 in FIG. 8. A different feature from the processing in FIG. 8 is in that the processing to terminate the printing service in step S813 in FIG. 8 is not carried out herein. Accordingly, unlike the first embodiment, the head replacement processing is carried out in this embodiment while not terminating the printing service.

In the explanation of this flow, the head replacement to be conducted by the user is assumed in the first place to be the head replacement of the same type due to the ink runout. Specifically, it is assumed that the user replaces only the right head with a new color head and then presses a head replacement button.

If it is determined that the head replacement is completed in step S915, the processing proceeds to step S916. In steps S916 and S917, the head type IDs of the left and right heads are obtained as with the steps S902 and S903.

Next, in step S918, the printing service providing unit 416 determines whether or not the configuration number is changed. In the assumed processing mentioned above, the configuration number at the point of step S918 is "1", which is identical to the configuration number at the point of step S904. Accordingly, the result of determination turns out to be NO. If the result of determination in step S918 is NO, the processing proceeds to step S906 and the above-described processing is repeated thereafter. According to this processing, if the configuration number is not changed, or in the case of just the replacement with the print head of the same type due to the ink runout and the like, then it is possible to continue the printing service. For instance, with respect to the host device 300 which divides a series of printing into multiple printing jobs and transmits the printing jobs, it is possible to continue the printing service without cancelling and aborting the printing jobs.

Next, a description will be given of the case in which the user performs the replacement of the head of a different type instead of the replacement of the head of the same type. Specifically, the case in which the user replaces both the right and left heads with black heads in step S914 will be described as an example. In this case, the head type IDs of the left and right heads obtained in steps S916 and S917 are "black". Accordingly, the configuration number at the point of step S918 is "2". Hence, this configuration number does not match the configuration number at the point of step S904. Therefore, the configuration number is determined to be changed in step S918, and the processing proceeds to step S913.

In step S913, the printing service providing unit 416 terminates the printing service by performing the same processing as that in step S813 in FIG. 8. Then, the processing proceeds to step S904 and the above-described processing is repeated thereafter.

According to the above-described processing, at the start of the printing service in the next steps S904 and S905, the pieces of information turn out to be as follows:
  Step S904 *the configuration number="2";
  Step S905 *the printing device name: PRINTER_K_A4;
  *the printability information
    the printing color=BK;
    the printing width=210 mm; and
    the ink=1 color: K.

For this reason, as described in the first embodiment, the host device 300 recognizes that a different device has started the printing service.

As described above, in this embodiment, the printing service currently in action is terminated at a stage of the change in the head configuration (that is, at a stage where it is definitely necessary to update the printing device name). According to the above-described processing, if the head replacement conducted by the user is the head replacement to deal with the ink runout, then it is possible to maintain the connection to the host device and to continue the printing job without aborting the printing job. Hence, it is possible to reliably transmit the printability information to the external host device 300 as described in the first embodiment. As a consequence, it is possible to reduce the chance of occurrence of the disagreement between the printing job issued by the host device 300 and the printability condition of the printer 100.

Note that in the description of the first embodiment and the second embodiment, only the transition from the state of the configuration number "1" to the state of the configuration number "2" has been described. However, a similar effect can be obtained in other aspects of a transition to a state of a different configuration number or of a transition from a state of a different configuration number. The first embodiment and the second embodiment have mainly described the example of the change in the "printing color". However, other printability conditions including the "printing width", the "ink", and so forth may also be changed as a result of a transition to a state of a different configuration number. In this regard, according to the processing of the first embodiment or the second embodiment, it is possible to transmit these changes to the host device 300 as well.

Meanwhile, in the first embodiment and the second embodiment, a description is omitted in a case where no print heads are loaded on the carriage 103 at all because it is not possible to provide any printing service in such a situation. A situation in which no heads are loaded may arise in the course of a transition of the head configuration. Even in that case, the processing will be conducted appropriately in accordance with the processing of the above-described embodiments. For instance, let us assume a case in which the heads loaded on the right and left are both the color print heads, and both the print heads are once removed to establish the state of not loading any heads and then color print heads are loaded again. In this case, even though there is the state of loading no heads in the middle, the right and left heads remain as the color print heads and there is no change in this respect in the case where the head configuration is taken into consideration as a whole. For this reason, it is not necessary to terminate provision of the printing service to the host device 300 and to start another printing service under a different printing device name again. Here, in the case of the processing of the second embodiment, if an unloaded state is set to a particular configuration number, then the provision of the printing service will be stopped once even in the case where there is eventually no change in the head configuration even though there is an unloaded state in the middle. Accordingly, in the case of the processing of the second embodiment, it is preferable not to set the unloaded state to a particular configuration number so as to reduce the unnecessary stop of the service.

Note that the second embodiment has described the example in which the printer 100 determines whether the head replacement is the head replacement for the ink replacement or the head replacement that may affect the printing condition, by checking whether or not the configuration number is changed. However, the present invention is not limited only to this example. In the case where the combinations of the type IDs of the heads loaded on the right and left and the printability information corresponding to the combinations are stored in different list formats, for example, then it is possible to conduct the similar determination without using the configuration numbers.

Third Embodiment

The first and second embodiments have described the example of the printer having the configuration in which there is a region that cannot be printed with one of the print heads in the case of printing a sheet in a predetermined size. In this embodiment, a description will be given of an aspect of using a type of a printer loading one black print head and one color print head, each of which is capable of printing the same printing region in the case of printing a sheet in a predetermined size.

Figure 10:
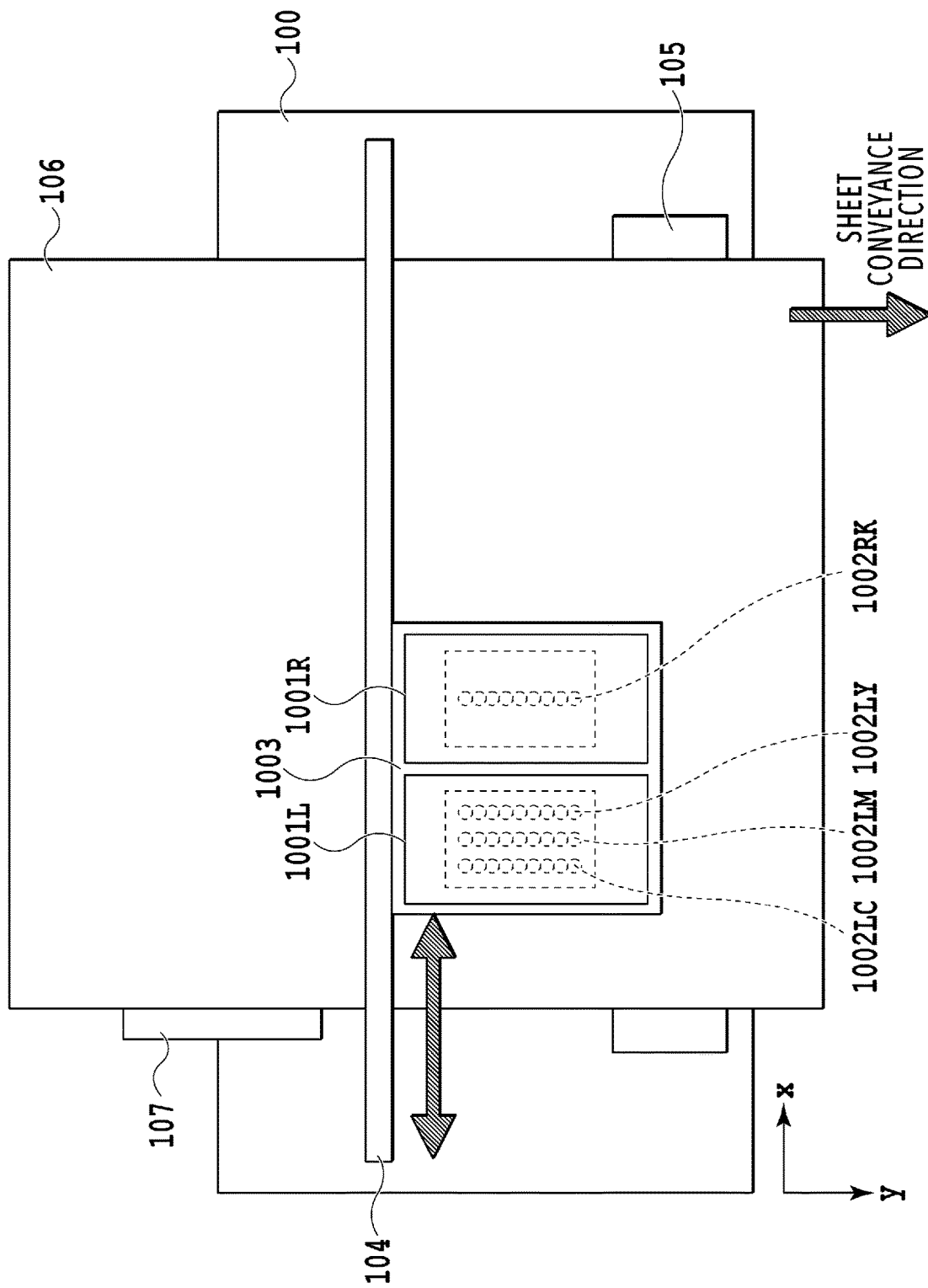
FIG. 10 is a diagram schematically showing an inkjet printer.

FIG. 10 is a diagram schematically showing an inkjet printer of this embodiment. In FIG. 10, configurations other than a fifth print head 1001L and a sixth print head 1001R to be loaded on a carriage 1003 are the same as those in FIG. 1 and explanations thereof will be omitted. The fifth print head 1001L includes multiple nozzles for ejecting inks. These multiple nozzles form nozzle arrays that correspond to the inks of multiple colors. Specifically, the fifth print head 1001L loads a cyan nozzle array 1002LC, a magenta nozzle array 1002LM, and a yellow nozzle array 1002LY. The sixth print head 1001R includes a black nozzle array 1002RK for ejecting the ink. In short, the fifth print head 1001L is a color print head and the sixth print head 1001R is a black print head.

The printer 100 is capable of performing the monochrome printing and the color printing in the case where the printer 100 loads both the fifth print head 1001L capable of performing the color printing and the sixth print head 1001R capable of performing the black printing, and in the case where the printer 100 loads only the fifth print head 1001L. In the meantime, the printer 100 is capable of performing the monochrome printing in the case where the printer 100 loads only the sixth print head 1001R capable of performing the black printing.

Figure 11:
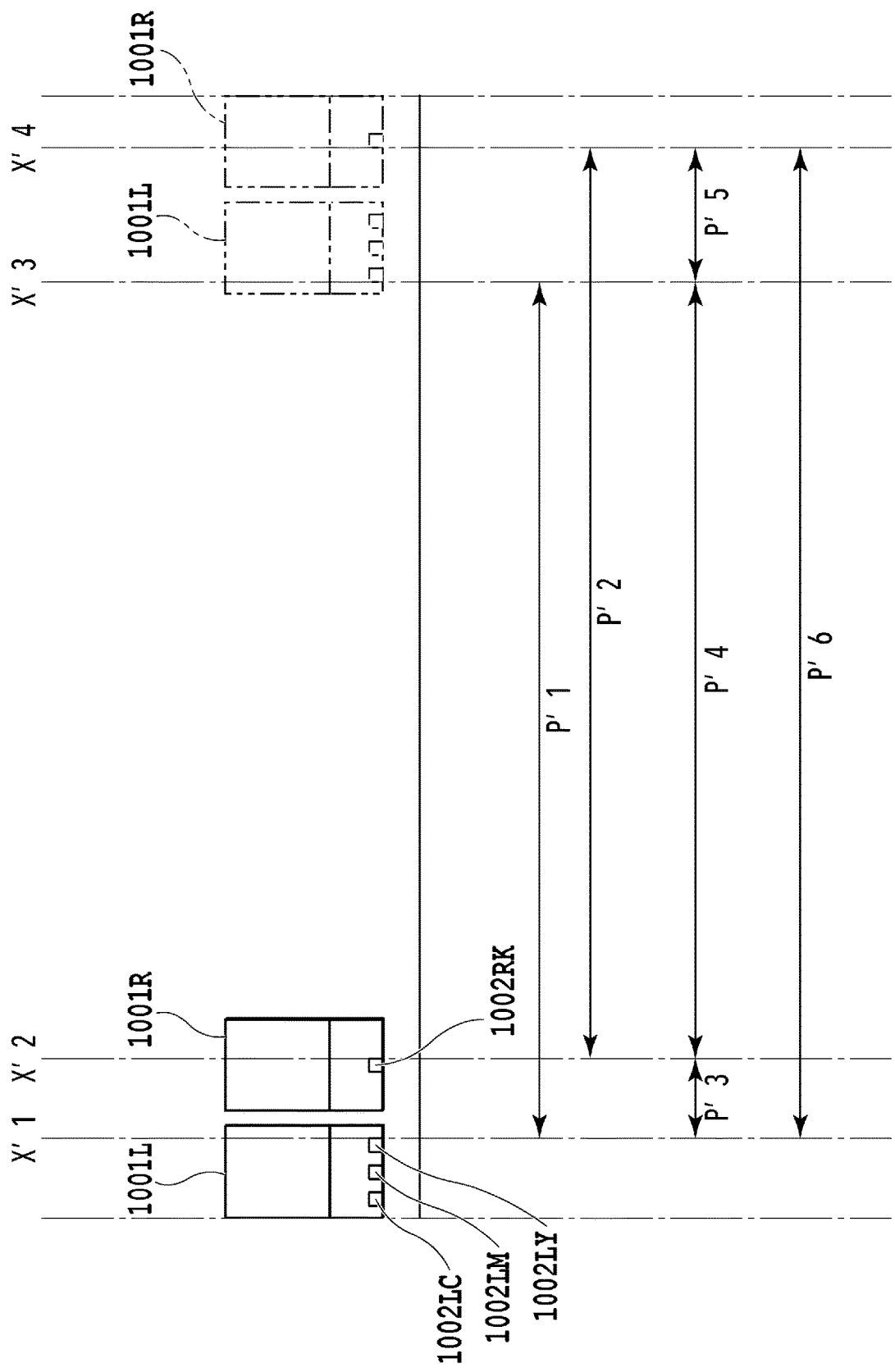
FIG. 11 is a diagram to explain printable regions of print heads.

FIG. 11 is a diagram to explain printable regions in the case of using the fifth print head 1001L and the sixth print head 1001R. Explanations of constituents in FIG. 11 that have been described in conjunction with FIG. 10 will be omitted herein. In FIG. 11, positions X'1, X'2, X'3, and X'4 represent positions in the X direction on the sheet surface of the printing sheet 106, namely, represent the following positions:

X'1=a left end of a region printable by the fifth print head 1001L;

X'2=a left end of a region printable by the sixth print head 1001R;

X'3=a right end of the region printable by the fifth print head 1001L; and X'4=a right end of the region printable by the sixth print head 1001R.

Meanwhile, regions P'1 to P'6 in FIG. 11 represent regions in the X direction on the sheet surface of the printing sheet 106, namely, represent the following regions:

P'1=the region printable by the fifth print head 1001L;

P'2=the region printable by the sixth print head 1001R;

P'3=a region printable only by the fifth print head 1001L;

P'4=a region printable by both the fifth print head 1001L and the sixth print head 1001R;

P'5=a region printable only by the sixth print head 1001R; and

P'6=a region printable by at least one of the print heads.

In this embodiment, a width of the region P'4 is set to "210 mm". Accordingly, it is possible to print a printing region equivalent to the A4 width even by using the right and left print heads or by using one of the heads only.

Table 3 summarizes combinations of the left head and the right head to be loaded on the printer 100 of FIG. 10, and printing modes and printable sizes available for printing in these combinations.

TABLE 3

Head Configuration List of Third Embodiment

| Configuration Number | Left-hand Loaded Head | Right-hand Loaded Head | Color Printing Width | Monochrome Printing Width |
|---|---|---|---|---|
| 1 | color | black | 210 mm | 210 mm |
| 2 | none | black | NA | 210 mm |
| 3 | color | none | 210 mm | 120 mm |

In view of Table 3, the printer 100 in FIG. 10 has the following characteristics depending on the combinations of the types of the loaded print heads:

If the color print head is attached as the left head, then it is possible to perform both the color printing and the monochrome printing (see configuration numbers 1 and 3); and If the black print head is attached as the right head, then it is possible to perform the monochrome printing (see configuration numbers 1 and 2).

Meanwhile, regarding the printing width, it is possible to print a width up to 210 mm by using any of the head configurations. In this embodiment, every head configuration represents an aspect that enables the printing for the width up to 210 mm. Therefore, the sheet guide 107 does not have to be fixed to the left side. In other words, this embodiment may use a sheet guide which is located at a central part of the printer 100 in such a way as to be capable of nipping the printing sheet 106, and is capable of adjusting the size in the right-left direction.

FIG. 8 used for the description in the first embodiment will be employed as an actual processing flow. The contents of the processing are the same as those of the first embodiment and explanations thereof will be omitted. However, the contents to be transmitted to the external host device in step S805 in FIG. 8 are different from those in this embodiment. The different features will be described below.

First, in this embodiment, the printer 100 in FIG. 11 in the initial state is assumed to be in the state of the configuration number "1" in Table 3. Meanwhile, a list of the printability information of the third embodiment is assumed to be as shown in Table 4.

TABLE 4

Printing Device Names and Printability Information of Third Embodiment

| | | Printability Information | | |
|---|---|---|---|---|
| Configuration Number | Printing Device Name | Printing Colors | Printing Width | Ink |
| 1 | PRINTER_CMYK_A4 | BK & COLOR | 210 mm | 4 COLORS: CMYK |
| 2 | PRINTER_K_A4 | BK | 210 mm | 1 COLOR: K |
| 3 | PRINTER_CMY_A4 | BK & COLOR | 210 mm | 3 COLORS: CMY |

In this case, the information to be transmitted to the external host device 300 in step S805 in FIG. 8 is as follows. Specifically, the "printing device name" and the "printability information" stated in Table 4 will be disclosed and transmitted based on the configuration number:
the printing device name: PRINTER_CMYK_A4;
the printability information:
the printing colors=BK & COLOR;
the printing width=210 mm; and
the ink=4 colors: CMYK.

This embodiment assumes the case in which the user removes the left side print head capable of performing the color printing, and presses the head replacement completion button without attaching a new print head. In this case, if the processing in step S802 and so forth is performed again after the completion of the head replacement processing in step S814 in FIG. 8, the pieces of the information to be obtained in the respective steps turn out to be as follows:
Step S802 *the head type ID of the left head="none";
Step S803 *the head type ID of the right head="black";
Step S804 *the configuration number="2";
Step S805 *the printing device name: PRINTER_K_A4;
*the printability information
the printing color=BK;
the printing width=210 mm; and
the ink=1 color: K.

As described above, the printing device name is updated as with the processing described in the first embodiment. For this reason, the host device 300 can reflect the printability information. As a consequence, it is possible to reduce the chance of occurrence of the disagreement between the printing job issued by the host device 300 and the printability condition of the printer 100.

While this embodiment has explained the processing based on the flow of the first embodiment in FIG. 8, a similar effect is obtained by using the flow of the second embodiment in FIG. 9 instead.

Meanwhile, in the description of this embodiment, only the transition from the state of the configuration number "1" to the state of the configuration number "2" has been described. However, the same processing is performed in the case of a transition to a state of a different configuration number or of a transition from a state of a different configuration number. The transition between such different configuration numbers changes not only the "printing color" but also other factors including the "ink" and so forth. Accordingly, it is also possible to transmit such other changes to the host device 300.

Other Embodiments

The first to third embodiments have described the example in which the carriage 103 can load multiple print heads. However, the present invention is also applicable to a printer in which the carriage 103 can load a single print head. Regarding the processing in the case of applying the present invention to the printer in which the carriage 103 can load the single print head, a transition between the configuration number "2" and the configuration number "3" shown in Table 3 and Table 4 in the third embodiment corresponds to this case. In other words, according to the present invention, the number of print heads to be loaded at the same time may be set to any number equal to or more than one as long as the printer is provided with the carriage that can load at least two types of the print heads.

In the meantime, the first to third embodiments have described the print heads of two types of color sets as the print heads to be loaded on the carriage 103, namely, the "color print head loading the CMY inks" and the "monochrome print head loading the Bk ink". However, the present invention is not limited only to these examples. For instance, the present invention is applicable to aspects of using a "special color print head loading inks in special colors including orange, green, violet, and the like", a "photographic print head loading inks such as light C, light M, light Bk, and the like", and so forth. In the meantime, the present invention is also applicable to an aspect of using a "functional printing print head loading any of inks containing silver, a fluorescence, a fragrance, and the like". In other words, it is possible to achieve the effects similar to the effects described in the first to third embodiments even in the case of using print heads with which printability conditions (such as the number of used ink colors, printing quality, a printing purpose, and a type of an end product) are changed depending on the combination of the print heads.

Meanwhile, the first to third embodiments have described the example of the aspect in which the host device 300 includes the printing app 400. However, the present invention is not limited only to this aspect. The host device 300 may apply an aspect configured to output an instruction to a program for a printing service provided on a cloud, for example, and to receive a result therefrom. Meanwhile, although the present invention has described the aspect in which the printing app 400 uses the signal network protocol for the printing service. However, the printing app 400 may be capable of using multiple network protocols for the printing service. Here, the network protocol used by the printing app 400 only needs to be capable of recognizing a change in a device along with a change in the head configuration of the printer 100. Moreover, the present invention is not limited only to the aspect to be applied to the printing app 400 that does not obtain the printability information. The present invention is naturally applicable to the host device 300, which is configured to obtain the printability information as appropriate in response to a change in the head configuration.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to reduce the chance of occurrence of the disagreement between the printability condition of the printing apparatus and the printability condition recognized by the host device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-071532, filed Mar. 31, 2017, and No 2017-228146, filed Nov. 28, 2017, which are hereby incorporated by reference wherein in their entirety.

What is claimed is:

1. A printing system comprising:
    a printing apparatus including a print unit configured to print an image on a printing medium; and
    a display device configured to display information;
    wherein
    the display device displays a first identifier to identify a printing device corresponding to the printing apparatus in a first configuration in which a first type of printing material is loaded to the print unit, and
    a second identifier being different from the first identifier to identify a printing device corresponding to the printing apparatus in a second configuration in which at least a second type of printing material different from the first type of printing material is loaded to the print unit without loading the first type of printing material to the print unit.

2. The printing system according to claim 1, wherein the print unit includes a carriage being capable of loading a plurality of the print heads.

3. The printing system according to claim 1, wherein the first type of printing material and the second type of printing material are ink.

4. The printing system according to claim 1, wherein the first type of printing material is different from the second type of printing material in color.

5. The printing system according to claim 1, wherein the first type of printing material is black ink and the second type of printing material is color ink.

6. The printing system according to claim 2, wherein the carriage scans over a print medium for printing on the print medium.

7. The printing system according to claim 1, wherein the printing apparatus in the first configuration and the printing apparatus in the second configuration provide a printing service by using the same network protocol.

8. The printing system according to claim 1, wherein the first identifier is a first identification name of the printing apparatus, and the second identifier is a second identification name of the printing apparatus.

9. The printing system according to claim 8, wherein the first identification name is a first device name, and the second identification name is a second device name.

10. The printing system according to claim 9, wherein at least a front part of the first device name coincides with a front part of the second device name.

11. The printing system according to claim 10, wherein in a case where the printing apparatus is in the first configuration, the display device displays information indicating that the printing device identified by the second identifier is not available.

12. The printing system according to claim 1, further comprising a host device communicated with the printing apparatus and the display device.

13. The printing system according to claim 1, wherein the display device further displays a third identifier being different from the first identifier and the second identifier to identify a printing device corresponding to the printing apparatus in a third configuration different from the first configuration and the second configuration.

14. The printing system according to claim 1, wherein the display device displays the first identifier and the second identifier when the printing apparatus is in the first configuration.

15. The printing system according to claim 14, wherein the display device displays the first identifier and the second identifier if configuration of the printing apparatus is changed to the second configuration from the first configuration.

16. A printing system comprising:
a printing apparatus including a print unit configured to print an image on a printing medium; and
a display device configured to display information,
wherein in a case where the print unit corresponds to a first configuration in which a first type of printing material is loaded to the print unit, the display device displays a first identifier to identify a printing device corresponding to the printing apparatus in the first configuration, and
in a case where the print unit corresponds to a second configuration in which at least a second type of printing material is loaded to the print unit without loading the first type of printing material to the print, the display device displays a second identifier to identify a printing device corresponding to the printing apparatus in a second configuration in which at least a second type of printing material different from the first type of printing material is loaded to the print unit without loading the first type of printing material to the print unit.

17. A printing system comprising:
a printing apparatus including a print unit configured to print an image on a printing medium; and
a display device configured to display information, wherein
the display device displays a first identifier to identify a printing device corresponding to the printing apparatus in a first configuration in which a first type of printing material is loaded to the print unit, and a second identifier being different from the first identifier to identify a printing device corresponding to the printing apparatus in a second configuration different from the first configuration in which a printing material is loaded to the print unit.

18. A method of controlling a printing system provided with
a printing apparatus including a print unit configured to print an image on a printing medium; and
a display device configured to display information,
the method comprising:
causing the display device to display a first identifier to identify a printing device corresponding to the printing apparatus in a first configuration in which a first type of printing material is loaded to the print unit, and
a second identifier being different from the first identifier to identify a printing device corresponding to the printing apparatus in a second configuration in which at least second type of printing material different from the first type of printing material is loaded to the print unit without loading the first type of printing material to the print unit.

19. The method according to claim 18, wherein
the print unit includes a carriage being capable of loading a plurality of the print heads.

20. The method according to claim 18, wherein
the first type of printing material and the second type of printing material are ink.

21. The method according to claim 18, wherein
the first type of printing material is different from the second type of printing material in color.

22. The method according to claim 18, wherein
the first type of printing material is black ink and the second type of printing material is color ink.

23. The method according to claim 22, wherein
the carriage scans over a print medium for printing on the print medium.

24. The method according to claim 18, the method further comprising causing the printing apparatus in the first configuration and the printing apparatus in the second configuration to provide a printing service by using the same network protocol.

25. The method according to claim 18, wherein
the first identifier is a first identification name of the printing apparatus, and the second identifier is a second identification name of the printing apparatus.

26. The method according to claim 25, wherein
the first identification name is a first device name, and the second identification name is a second device name.

27. The method according to claim 26, wherein at least a front part of the first device name coincides with a front part of the second device name.

28. The method according to claim 27, further comprising in a case where the printing apparatus is in the first configuration, causing the display device to display information indicating that the printing device identified by the second identifier is not available.

29. The method according to claim 18, wherein the printing system is further provided with a host device communicated with the printing apparatus and the display device.

30. The method according to claim 18, further comprising causing the display device to display a third identifier being different from the first identifier and the second identifier to identify a printing device corresponding to the printing apparatus in a third configuration different from the first configuration and the second configuration.

31. The method according to claim 18, wherein causing the display device to display includes displaying the first identifier and the second identifier when the printing apparatus is in the first configuration.

32. The method according to claim 31, wherein causing the display device to display includes displaying the first identifier and the second identifier if configuration of the printing apparatus is changed to the second configuration from the first configuration.

* * * * *